United States Patent
Nakaho et al.

(10) Patent No.: US 6,480,335 B1
(45) Date of Patent: Nov. 12, 2002

(54) REFLECTING MIRROR

(75) Inventors: Junichi Nakaho; Noriyuki Takai; Hiroshi Yoshida, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/484,182

(22) Filed: Jan. 18, 2000

(30) Foreign Application Priority Data

| Jan. 19, 1999 | (JP) | 11-010832 |
| Feb. 10, 1999 | (JP) | 11-033369 |
| Aug. 6, 1999 | (JP) | 11-223778 |

(51) Int. Cl.$^7$ ................................ G02B 5/28
(52) U.S. Cl. ............... 359/584; 359/838; 359/582; 359/585
(58) Field of Search ............... 359/838, 582, 359/584, 585; 428/912.2, 913

(56) References Cited

U.S. PATENT DOCUMENTS

| 4,673,248 A | 6/1987 | Taguchi et al. | |
| 2001/0030808 A1 * | 10/2001 | Komatsu et al. | 359/507 |

FOREIGN PATENT DOCUMENTS

| EP | 0 816 466 A | 1/1998 |
| EP | 0 820 967a | 1/1998 |
| EP | 0 903 389 A | 3/1999 |
| JP | 07-132774 | 5/1995 |
| JP | 09-225303 | 9/1997 |
| JP | 10-36144 | 2/1998 |
| JP | 10-046530 | 4/1998 |
| JP | 10-125583 | 5/1998 |
| JP | 10-156999 | 6/1998 |

\* cited by examiner

*Primary Examiner*—Cassandra Spyrou
*Assistant Examiner*—Fayez Assaf
(74) *Attorney, Agent, or Firm*—Nixon Peabody LLP; Thomas W. Cole

(57) ABSTRACT

A reflecting mirror is obtained which prevents double images from being formed and provides sufficient the hydrophilic property. The hydrophilic coating is approximately 15 nm in thickness and the photocatalytic coating between the hydrophilic coating and the glass substrate is approximately 240 nm in thickness. This setting of dimensions reduces the surface optical reflectance of light having a wavelength ranging from approximately 550 nm to 580 nm. This also reduces the deterioration of the photocatalytic action caused by the diffusion of sodium ions contained in the glass substrate into the photocatalytic coating. Furthermore, the aforementioned setting of dimensions turns the color of surface reflected light to whitish. Even when images formed by the surface reflected light or images formed by reflected light from the reflecting film interfered by surface reflected light are viewed, the after-image thereof hardly remains.

7 Claims, 22 Drawing Sheets

RELATIONSHIP BETWEEN THE THICKNESS OF PHOTOCATALYTIC
COATING 30 AND CHROMATICITY COORDINATES

SPECTRAL CHARACTERISTICS OF LIGHT
REFLECTED ON REFLECTING MIRROR 60

RELATIONSHIP BETWEEN THE THICKNESS OF PHOTOCATALYTIC COATING 162 AND COLOR OF SURFACE REFLECTED LIGHT

REFLECTING MIRROR

BACKGROUND OF THE INVENTION

1. Field of the Invention

The present invention relates to reflecting mirrors for reflecting light, and more particularly to a reflecting mirror suitable for outdoor use.

2. Description of the Related Art

Vehicles are provided with reflecting mirrors that are so-called side mirrors (may be designated door mirrors or outer view mirrors) for viewing the right and left rear sides. Recently, such reflecting mirrors that have two layers of coatings, that is, a silicon dioxide layer and a titanium dioxide layer have been used, which are to be described below.

That is, the reflecting mirror of this type is exposed to rain since the mirror is mounted outside the cabin of a vehicle. At this time, water droplets such as raindrops adhered on the surface of the reflecting mirror would cause reflected images to be distorted. Accordingly, a hydrophilic coating composed such as of silicon dioxide ($SiO_2$) is formed on the surface of the reflecting mirror to improve the hydrophilic property thereof and thus turn the water adhered on the surface into a thin film. This prevents distortion of reflected images caused by settlement of water droplets.

On the other hand, a reflecting mirror of this type always has a chance to have ingredients (mainly organic substances) such as exhaust gases of other vehicles, which adhere on the surface of the reflecting mirror. The adherence of the ingredients on the surface of the reflecting mirror will cause the hydrophilic property provided by means of the aforementioned hydrophilic coating. Accordingly, a photocatalytic coating composed of titanium dioxide ($TiO_2$) or the like is provided between the hydrophilic coating and the glass surface. Thus, it is intended to maintain the hydrophilic property of the surface (that is, the surface of the reflecting mirror) of the hydrophilic coating by decomposing organic substances adhered on the hydrophilic coating by means of the photocatalytic action such as titanium dioxide near the surface of the reflecting mirror.

Furthermore, the aforementioned photocatalytic coating with the hydrophilic coating having a thickness of 20 nm or greater cannot allow the photocatalytic action of the photocatalytic coating to be effected on the surface of the hydrophilic coating. Thus, full use of the function cannot be made. On the other hand, as shown in FIG. 21, the photocatalytic coating itself having a thickness below 200 nm cannot prevent a sodium ingredient contained in the glass from being diffused into the photocatalytic coating. An experiment shows that this sodium ingredient reduces the photocatalytic action, whereby the contact angle of water droplets becomes much larger on the surface of the hydrophilic coating and full use of the function cannot be made.

However, to make full use of the photocatalytic action in consideration of the aforementioned fact, for example, the hydrophilic coating is set to approximately 15 nm in thickness and the photocatalytic coating is set to approximately 300 nm in thickness. This provides a surface optical reflectance of approximately 24% of the hydrophilic coating layer and that of approximately 35% of a chromium (Cr) coating provided on the back surface of the glass as a reflecting film. As such, the surface optical reflectance of the hydrophilic coating and the chromium coating being close to each other (that is, no significant difference between the two) would cause light to be reflected substantially likewise on the surfaces of the hydrophilic coating and the chromium coating. Particularly, as shown in FIG. 22, in terms of the spectral characteristics of light, light having a wavelength of 550 nm to which human eyes are most sensitive allows the surface reflections on the hydrophilic coating and that on the chromium coating to have substantially the same optical reflectance. This will cause a viewer of the reflecting mirror to view both of the reflected lights, which provides a double image that has the same two images slightly shifted to each other when viewed on the reflecting mirror.

SUMMARY OF THE INVENTION

In view of the aforementioned fact, the object of the present invention is to provide a reflecting mirror that prevents a double image and secures a sufficient hydrophilic property.

To achieve the aforementioned object, a reflecting mirror according to the present invention comprises a substantially transparent glass substrate having opposite sides, a reflecting film which provided on one side of the glass substrate for reflecting light incident on the other side of the glass substrate, a hydrophilic coating predominantly composed of silicon dioxide, provided on the side of the glass substrate opposite the reflecting film, having a thickness ranging from 5 nm to 20 nm, and a photocatalytic coating predominantly composed of titanium dioxide, provided between the hydrophilic coating and the glass substrate, having a thickness ranging from 220 nm to 280 nm, for decomposing organic substances adhered on of the hydrophilic coating by a photocatalytic action.

According to an aspect of the present invention, a reflecting mirror is characterized in that the thickness of the photocatalytic coating ranges from 250 nm to 280 nm.

According to another aspect of the present invention, a reflecting mirror is characterized by selectively reflecting light of a wavelength ranging from 430 nm to 490 nm.

According to another aspect of the present invention, a reflecting mirror is characterized in that the reflecting film includes a reflecting film body for reflecting incident light, and an optical thin film, for selectively absorbing light of a wavelength other than a wavelength ranging mainly from 430 nm to 490 nm, provided between the reflecting film body and the glass substrate.

According to another aspect of the present invention, a reflecting mirror is characterized in that the glass substrate selectively absorbs light of a wavelength other than a wavelength ranging mainly from 430 nm to 490 nm of transmitted light.

A reflecting mirror according to another aspect is characterized by comprising a substantially transparent glass substrate having opposite sides, a reflecting film which provided on one side of the glass substrate for reflecting light incident on the other side of the glass substrate, a hydrophilic coating predominantly composed of silicon dioxide, provided on the side of the glass substrate opposite the reflecting film, having a thickness ranging from 5 nm to 20 nm, and a photocatalytic layer predominantly composed of titanium dioxide, provided between the hydrophilic coating and the glass substrate, having a thickness ranging from 100 nm to 140 nm, for decomposing organic substances adhered on the hydrophilic coating by photocatalytic action, and a photocatalytic coating, predominantly composed of silicon dioxide, provided between the glass substrate and the photocatalytic layer, having a thickness of at least 80 nm, and including a sodium diffusion limiting layer for limiting diffusion of sodium ions from the glass substrate into the photocatalytic layer, the reflecting mirror selectively reflecting light of a wavelength ranging mainly from 430 nm to 490 nm contained in light reflected on the reflecting film before the reflected light passes through the glass substrate.

A reflecting mirror according to another aspect is characterized by comprising a substantially transparent glass substrate having opposite sides and an optical reflectane, a reflecting film provided on one side of the glass substrate for reflecting light incident on the other side of the glass substrate, a hydrophilic coating, provided on the other side of the glass substrate, a photocatalytic layer, provided between the hydrophilic coating and the glass substrate, for decomposing organic substances adhered on the hydrophilic coating by photocatalytic action, and a sodium diffusion limiting coating, having an optical reflectance less than that of the glass substrate, and located between the photocatalytic coating and the glass substrate for limiting diffusion of sodium ions from the glass substrate into the photocatalytic coating.

According to another aspect of the present invention, a reflecting mirror is characterized in that the hydrophilic coating includes a silicon dioxide layer having a thickness ranging from 5 nm to 20 nm and predominantly composed of silicon dioxide.

According to another aspect of the present invention, a reflecting mirror is characterized in that the photocatalytic coating comprises a titanium dioxide layer predominantly composed of titanium dioxide, provided between the silicon dioxide layer and the glass substrate, and having a thickness ranging from 110 nm to 140 nm.

According to another aspect of the present invention, a reflecting mirror is characterized in that the sodium diffusion limiting coating comprises a silicon dioxide layer predominantly composed of silicon dioxide, provided between photocatalytic coating and the glass substrate, and having a thickness ranging from 90 nm to 110 nm.

According to another aspect of the present invention, a reflecting mirror is characterized in that an electrochromic coating having a conductive coating which is colored or discolored by being energized or not energized is provided between the reflecting film and the glass substrate.

According to another aspect of the present invention, a reflecting mirroris characterized in that the sodium diffusion limiting coating includes a silicon dioxide layer predominantly composed of silicon dioxide, provided between the photocatalytic coating and the glass substrate, and having a thickness ranging from 70 nm to 90 nm, and a titanium dioxide layer predominantly composed of titanium dioxide, provided between the silicon dioxide layer and the glass substrate, and having a thickness ranging from 110 nm to 140 nm.

According to another aspect of the present invention, a reflecting mirror is characterized in that an electrochromic coating having a conductive coating which is colored or discolored by being energized or not energized is provided between the reflecting film and the glass substrate.

According to another aspect of the present invention, a reflecting mirroris characterized in that the sodium diffusion limiting coating includes a silicon dioxide layer predominantly composed of silicon dioxide, provided between photocatalytic coating and the glass substrate, and having a thickness ranging from 90 nm to 110 nm.

According to another aspect of the present invention, a reflecting mirror is characterized by comprising a substantially transparent glass substrate having opposite sides, a reflecting film provided on one side of the glass substrate and which reflects light incident on the other side of the glass substrate, a hydrophilic coating and provided on the other side of the glass substrate, and a photocatalytic coating, predominantly composed of titanium oxide, having a thickness ranging from 230 nm to 270 nm, provided between the hydrophilic coating and the glass substrate, for decomposing organic substances adhered on the hydrophilic coating by photocatalytic action.

DETAILED DESCRIPTION OF THE PREFERRED EMBODIMENTS

Figure 1:
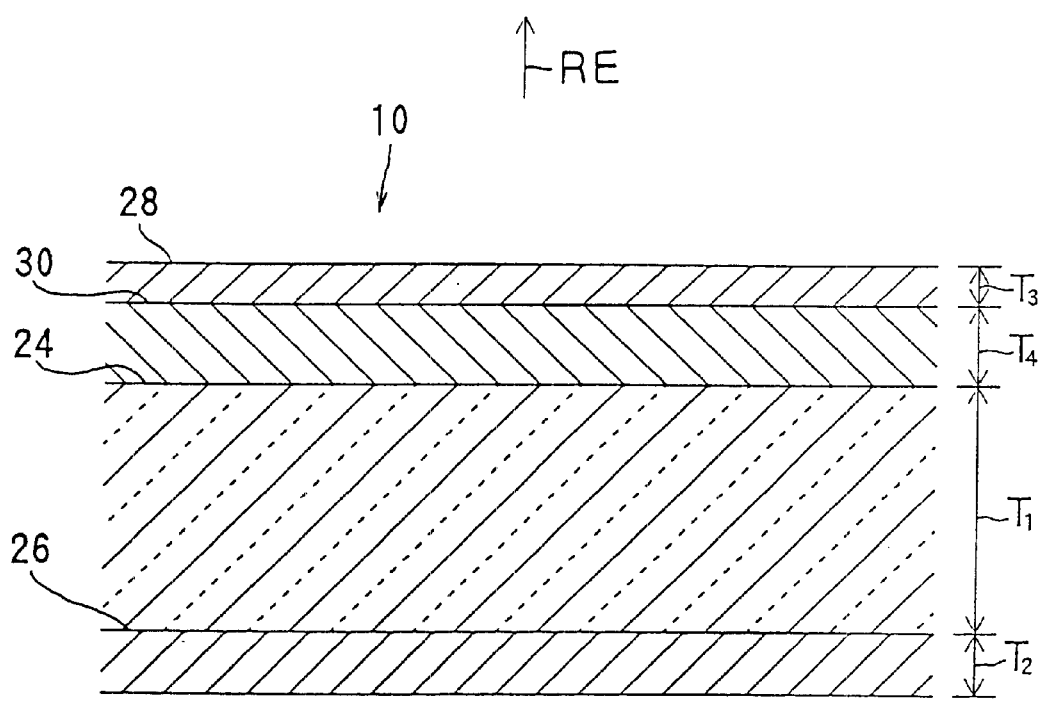
FIG. 1 is a schematic cross-sectional view showing the configuration of a reflecting mirror according to a first embodiment of the present invention.

According to the reflecting mirror set forth in the first aspect, the hydrophilic coating is provided on the surface of the reflecting mirror. This reduces the contact angle of a water droplet adhered on the surface of the reflecting mirror, forming the water droplet into a thin film as a whole. This reduces the distortion of reflected images that are reflected on the reflecting film. Furthermore, on the back side of the hydrophilic coating (that is, on the side of the glass substrate), a photocatalytic coating predominantly composed of titanium dioxide is provided. The photocatalytic action effected when light is impinged upon this photocatalytic coating serves to decompose organic substances such as oils adhered on the hydrophilic coating. This allows for keeping the surface of the hydrophilic coating clean and thus maintaining the hydrophilic property on the surface of the hydrophilic coating.

Furthermore, the photocatalytic coating is set to a range of 220 nm to 280 nm in thickness. This prevents the deterioration of the photocatalytic action caused by the diffusion of sodium ions contained in the glass substrate into the photocatalytic coating and secures sufficiently the photocatalytic action of the photocatalytic coating. In addition, the photocatalytic coating predominantly composed of titanium dioxide is set to the aforementioned range in thickness. This makes the surface optical reflectance of the reflecting mirror extremely low, thus reducing or preventing the formation of double images resulting from a reflected image provided by the surface reflected light and a reflected image provided by the reflected light on the reflecting film. Furthermore, the photocatalytic coating predominantly composed of titanium dioxide is set to the aforementioned range in thickness, thereby causing the hue of the surface reflected light of the reflecting mirror to become white, blue, or greenish (in other words, a hue not predominantly composed of red). Accordingly, this reduces or prevents an after-image of the reflected image provided by means of the surface reflected light when the surface reflected light is viewed.

In the present invention, the photocatalytic coating is set to a range of 250 nm to 280 nm in thickness. This allows the spectral characteristics of the reflected light on the surface of the hydrophilic coating to reach a peak value over a range of wavelength from 430 nm to 490 nm. The spectral characteristics are lowered within a range of wavelengths longer than this value (that is, the optical reflectance is reduced). Accordingly, the color of the surface reflected light becomes substantially blue.

For the wavelength of light, red has a longer wavelength and is greater in energy. Moreover, human eyes are more sensitive to red for a structural reason (more cells are present which are sensitive to red). When the surface reflected light predominantly composed of red has been viewed, the after-image of the light is apt to remain in the eye. However, since the hue of the reflected light from the reflecting film is mainly blue in the reflecting mirror as described in the foregoing, an after-image of the reflected light hardly remains in the eye.

Furthermore, even if the light reflected on the reflecting film is white or blue, interference of the surface reflected light would change the color thereof. Consequently, it is conceivable that the reflected light may contain reddish color having a longer wavelength. However, as described in the foregoing, the reflecting mirror provides less reflected light of reddish color having a longer wavelength due to the spectral characteristics of the surface. Accordingly, interference of the surface reflected light with the reflected light from the reflecting film would not result in reddish color, thereby hardly allowing the after-image to remain in the eye even when an image formed by the reflected light is viewed.

The reflecting mirror according to the present invention effects the action provided by the reflecting mirror according to the inventions described above. The mirror also selectively absorbs light of a wavelength other than a wavelength ranging mainly from 430 nm to 490 nm while the light is incident upon the glass substrate, reflected on the reflecting film, and then this reflected light is allowed to pass through the glass substrate. (That is, consequently, light of a wavelength ranging mainly from 430 nm to 490 nm is selectively reflected.) Accordingly, the reflected light having passed through the glass substrate becomes bluish.

Here, the reflecting mirror according to the present invention allows the photocatalytic coating to be within a range from 250 nm to 280 nm in thickness. As described in the foregoing, this makes the color of the surface reflected light to be bluish, and thus never changes the color drastically even when the surface reflected light of the hydrophilic coating interferes with the reflected light from the reflecting film. (That is, the color is not changed into reddish.) Therefore, the reflected light from the reflecting film forced to be bluish serves to maintain the effect that allows after-images to hardly remain when an image formed by the reflected light is viewed.

Furthermore, in the present invention, at least one of the members that constitute the reflecting mirror may selectively absorb light of a wavelength other than a wavelength ranging mainly from 430 m to 490 nm, so that the reflecting mirror selectively reflects light of a wavelength ranging mainly from 430 m to 490 nm. Therefore, for example, the reflecting mirror may be configured so that a glass substrate, or a light absorbing layer or the like disposed between the glass substrate and the reflecting film selectively absorbs light of a wavelength other than a wavelength ranging mainly from 430 m to 490 nm. Alternatively, the reflecting mirror may be configured so that the reflecting film selectively reflects light of a wavelength ranging mainly from 430 m to 490 nm.

In the present invention, in the light reflected on the reflecting film body, light of a wavelength other than a wavelength ranging mainly from 430 nm to 490 nm is selectively absorbed in an optical thin film, and the transmitted reflected light becomes bluish color. Therefore, viewing an image formed by this reflected light would not cause the after-image to hardly remain in the eye. Moreover, as described above, the reflecting mirror would not allow the surface reflected light to become reddish even when the surface reflected light interferes with the reflected light from the reflecting film.

In the present invention, light of a wavelength other than a wavelength ranging mainly from 430 nm to 490 nm is selectively absorbed when the light reflected on the reflecting film passes through the glass substrate. This allows the transmitted reflected light to become bluish. Therefore, viewing an image formed by this reflected light would not cause the after-image to hardly remain in the eye. Moreover, as described above, the reflecting mirror would not allow the surface reflected light to become reddish even when the surface reflected light interferes with the reflected light from the reflecting film.

In the present invention, the hydrophilic coating is provided on the surface of the reflecting mirror. This reduces the contact angle of a water droplet adhered on the surface of the reflecting mirror, forming the water droplet into a thin film as a whole. This reduces the distortion of reflected images that are reflected on the reflecting film. Furthermore, on the back side of the hydrophilic coating (that is, on the side of the glass substrate), a photocatalytic coating having a photocatalytic layer predominantly composed of titanium dioxide is provided. The photocatalytic action effected when light is impinged upon this photocatalytic layer of the photocatalytic coating serves to decompose organic substances such as oils adhered on the hydrophilic coating. This allows for keeping the surface of the hydrophilic coating clean and thus maintaining the hydrophilic property on the surface of the hydrophilic coating.

Furthermore, the photocatalytic coating is provided with a sodium diffusion limiting layer predominantly composed of silicon dioxide. This sodium diffusion limiting layer is interposed between the photocatalytic layer and the glass substrate. This will limit the diffusion of sodium ions contained in the glass substrate into the photocatalytic layer and thus the deterioration of the photocatalytic action caused by the diffusion of sodium ions into the photocatalytic layer can be prevented or inhibited.

Furthermore, light of a wavelength other than a wavelength ranging from 430 nm to 490 nm is mainly absorbed before the light reflected on the reflecting mirror passes through the glass substrate, that is, at least either at the time of reflection at the reflecting film or at the time of transmission through the glass substrate. This allows the reflected light that has passed through the glass substrate to become bluish. For the wavelength of light, red has a longer wavelength and is greater in energy. Moreover, human eyes are more sensitive to red for a structural reason (more cells are present which are sensitive to red). When the surface reflected light predominantly composed of red has been viewed, the after-image of the light is apt to remain in the eye. However, since the hue of the reflected light from the reflecting film is mainly blue in the reflecting mirror as described in the foregoing, an after-image of the reflected light hardly remains in the eye.

Furthermore, the photocatalytic layer is set to a range of 100 nm to 140 nm in thickness and the sodium diffusion limiting layer is set to 80 nm or greater. The spectral characteristics of the reflected light from the reflecting film can be so made as to include less reddish reflected light having a longer wavelength even when interference has occurred between the surface reflected light from the hydrophilic coating and the reflected light from the reflecting film. This allows for maintaining the effect that an after-image to hardly remain in the eye even when images formed by means of the reflected light is viewed.

In the present invention, in the light reflected on the reflecting film body, light of a wavelength other than a wavelength ranging mainly from 430 nm to 490 nm is selectively absorbed in an optical thin film, and the transmitted reflected light becomes bluish color. Therefore, viewing an image formed by this reflected light would not cause the after-image to hardly remain in the eye. Moreover, as described above, the reflecting mirror would not allow the surface reflected light to become reddish even when the surface reflected light interferes with the reflected light from the reflecting film.

In the present invention, light of a wavelength other than a wavelength ranging mainly from 430 nm to 490 nm is selectively absorbed when the light reflected on the reflecting film passes through the glass substrate. This allows the transmitted reflected light to become bluish. Therefore, viewing an image formed by this reflected light would not cause the after-image to hardly remain in the eye. Moreover, as described above, the reflecting mirror would not allow the surface reflected light to become reddish even when the surface reflected light interferes with the reflected light from the reflecting film.

In the present invention, the hydrophilic coating is provided on the surface of the reflecting mirror. This reduces the contact angle of a water droplet adhered on the surface of the reflecting mirror, forming the water droplet into a thin film as a whole. This reduces the distortion of reflected images that are reflected on the reflecting film. Furthermore, on the back side of the hydrophilic coating (that is, on the side of the glass substrate), a photocatalytic coating is provided. The photocatalytic action effected when light is impinged upon this photocatalytic coating serves to break down organic substances such as oils adhered on the hydrophilic coating. This allows for keeping the surface of the hydrophilic coating clean and thus maintaining the hydrophilic property on the surface of the hydrophilic coating.

Here, a sodium diffusion limiting coating is provided between the glass substrate and the photocatalytic coating. This prevents sodium ions contained in the glass substrate from being diffused into the photocatalytic coating. This allows for making full use of the photocatalytic action without making the photocatalytic coating unnecessarily thicker. Furthermore, the photocatalytic coating can make full use of the photocatalytic action regardless of the thickness thereof, so that the photocatalytic coating can be set to a thickness that provides the surface optical reflectance thereof being lower than that of the glass substrate. Moreover, in the present invention, the surface optical reflectance of the sodium diffusion limiting coating itself is lower than that of the glass substrate. Accordingly, regardless of the superposition of the photocatalytic coating upon the sodium diffusion limiting coating, the optical reflectance can be made lower than the surface optical reflectance of the glass substrate as a whole. This allows the reflecting mirror to reduce or prevent the formation of double images caused by the surface reflection.

In the present invention, the hydrophilic coating is provided with a silicon dioxide layer predominantly composed of silicon dioxide with a thickness ranging from 5 nm to 20 nm. Here, the silicon dioxide layer hardly effects the hydrophilic function with the thickness below 5 nm. On the other hand, with the thickness greater than 20 nm, the photocatalytic action of the photocatalytic coating does not reach the surface of the hydrophilic coating. Therefore, the reflecting mirror allows for setting the thickness of the silicon dioxide layer constituting the hydrophilic coating to the aforementioned range, thereby maintaining hydrophilic function and effecting the photocatalytic action of the photocatalytic coating on the surface of the hydrophilic coating.

In the present invention, the photocatalytic coating comprises a titanium dioxide layer predominantly composed of titanium dioxide with a thickness ranging from 110 nm to 140 nm. An experiment shows that the layer predominantly composed of titanium dioxide has the lowest optical reflectance with the thickness ranging from 110 nm to 140 nm. Accordingly, the photocatalytic coating is replaced by a film having a titanium dioxide layer superimposed over the silicon dioxide layer having the aforementioned thickness, thereby reducing the optical reflectance of the surface of the reflecting film more effectively than ever. Thus, the formation of double images can be reduced or prevented more effectively than ever.

In the present invention, a silicon dioxide layer having a thickness ranging from 90 nm to 110 nm is provided to constitute the sodium diffusion limiting coating. Here, the layer composed of silicon dioxide is principally to have substantially the same refractive index as that of glass. Accordingly, when the silicon dioxide layer is provided on the surface of the glass substrate, from the point of view of refractive index, it is possible to take the silicon dioxide layer and the glass substrate as one member. Accordingly, the reflection of light between the silicon dioxide layer and the glass substrate can be reduced or prevented, thus reducing or preventing the formation of double images better than ever.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the sodium diffusion limiting coating comprises a silicon dioxide layer having a thickness ranging from 70 nm to 90 nm and a titanium dioxide layer having a thickness ranging from 110 nm to 140 nm. The titanium dioxide layer is provided on the side of the surface of the glass substrate and the silicon dioxide layer is provided on the side opposite to the glass substrate via this titanium dioxide layer. This makes the surface optical reflectance of the hydrophilic coating become approximately 5% over a range of wavelength from 520 nm to 620 nm, thus reducing or preventing the formation of double images over substantially the entire region of wavelengths that provide good sensitivity to the human eye.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, a silicon dioxide layer having a thickness ranging from 90 nm to 110 nm is provided to constitute the sodium diffusion limiting coating. Here, the layer composed of silicon dioxide is principally to have substantially the same refractive index as that of glass. Accordingly, when the silicon dioxide layer is provided on the surface of the glass substrate, from the point of view of refractive index, it is possible to take the silicon dioxide layer and the glass substrate as one member. Accordingly, the reflection of light between the silicon dioxide layer and the glass substrate can be reduced or prevented, thus reducing or preventing the formation of double images better than ever.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the sodium diffusion limiting coating comprises a silicon dioxide layer having a thickness ranging from 70 nm to 90 nm and a titanium dioxide layer having a thickness ranging from 110 nm to 140 nm. The titanium dioxide layer is provided on the side of the surface of the glass substrate and the silicon dioxide layer is provided on the side opposite to the glass substrate via this titanium dioxide layer. This makes the surface optical reflectance of the hydrophilic coating become approximately 5% over a range of wavelength from 520 nm to 620 nm, thus reducing or preventing the formation of double images over substantially the entire region of wavelengths that provide good sensitivity to the human eye.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the photocatalytic coating comprises a titanium dioxide layer predominantly composed of titanium dioxide with a thickness ranging from 110 nm to 140 nm. An experiment shows that a layer predominantly composed of titanium dioxide has the lowest optical reflectance with the thickness ranging from 110 nm to 140 nm. Accordingly, the photocatalytic coating is replaced by a film having a titanium dioxide layer superimposed over the silicon dioxide layer having the aforementioned thickness, thereby reducing the optical reflectance of the surface of the reflecting film more effectively than ever. Thus, the formation of double images can be reduced or prevented more effectively than ever.

In the present invention, a silicon dioxide layer having a thickness ranging from 90 nm to 110 nm is provided to constitute the sodium diffusion limiting coating. Here, the layer composed of silicon dioxide is principally to have substantially the same refractive index as that of glass. Accordingly, when the silicon dioxide layer is provided on the surface of the glass substrate, from the point of view of refractive index, it is possible to take the silicon dioxide layer and the glass substrate as one member. Accordingly, the reflection of light between the silicon dioxide layer and the glass substrate can be reduced or prevented, thus reducing or preventing the formation of double images better than ever.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the sodium diffusion limiting coating comprises a silicon dioxide layer having a thickness ranging from 70 nm to 90 nm and a titanium dioxide layer having a thickness ranging from 110 nm to 140 nm. The titanium dioxide layer is provided on the side of the surface of the glass substrate and the silicon dioxide layer is provided on the side opposite to the glass substrate via this titanium dioxide layer. This makes the surface optical reflectance of the hydrophilic coating become approximately 5% over a range of wavelength from 520 nm to 620 nm, thus reducing or preventing the formation of a double image over substantially the entire region of wavelengths that provide good sensitivity to the human eye.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, a silicon dioxide layer having a thickness ranging from 90 nm to 110 nm is provided to constitute the sodium diffusion limiting coating. Here, the layer composed of silicon dioxide is principally to have substantially the same refractive index as that of glass. Accordingly, when the silicon dioxide layer is provided on the surface of the glass substrate, from the point of view of refractive index, it is possible to take the silicon dioxide layer and the glass substrate as one member. Accordingly, the reflection of light between the silicon dioxide layer and the glass substrate can be reduced or prevented, thus reducing or preventing the formation of double images better than ever.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the sodium diffusion limiting coating comprises a silicon dioxide layer having a thickness ranging from 70 nm to 90 nm and a titanium dioxide layer having a thickness ranging from 110 nm to 140 nm. The titanium dioxide layer is provided on the side of the surface of the glass substrate and the silicon dioxide layer is provided on the side opposite to the glass substrate via this titanium dioxide layer. This makes the surface optical reflectance of the hydrophilic coating become approximately 5% over a range of wavelength from 520 nm to 620 nm, thus reducing or preventing the formation of double images over substantially the entire region of wavelengths that provide good sensitivity to the human eye.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

In the present invention, the hydrophilic coating is provided on the surface of the reflecting mirror. This reduces the contact angle of a water droplet adhered on the surface of the reflecting mirror, forming the water droplet into a thin film as a whole. This reduces the distortion of reflected images that are reflected on the reflecting film. Furthermore, on the reverse side of the hydrophilic coating (that is, on the side of the glass substrate), a photocatalytic coating is provided. The photocatalytic action effected when light is impinged upon this photocatalytic coating serves to compose organic substances such as oils adhered on the hydrophilic coating. This allows for keeping the surface of the hydrophilic coating clean and thus maintaining the hydrophilic property on the surface of the hydrophilic coating.

Here, in the reflecting mirror, the photocatalytic coating is set to a range of 230 nm to 270 nm in thickness. This allows sodium ions to exert no effect near the hydrophilic coating of the photocatalytic coating though sodium ions contained in the glass substrate diffuse into the photocatalytic coating, allowing for making use of the photocatalytic action.

Furthermore, when the thickness of the photocatalytic coating is set to the aforementioned range, the surface optical reflectance of the photocatalytic coating falls within a range from 15% to 19% when light equivalent to that from headlamps of other vehicle during night is incident thereupon. This will reduce the formation of double images caused by surface reflection.

Furthermore, setting the thickness of the photocatalytic coating to 230 nm or greater will cause the hue of the surface reflected light of the photocatalytic coating to become from light purple to light blue. Thus, the surface reflected light contains less light of low wavelengths that constitutes red. Here, reddish light has longer wavelengths and thus high energy and as well human eyes are highly sensitive to red for a structural reason thereof (more cells are present which are sensitive to red). Therefore, when images composed of light containing red are viewed, the after-image thereof is apt to remain. However, as described above, since the reflecting mirror allows the hue of surface reflected light of the photocatalytic coating to become substantially from light purple to light blue, a passenger who views images (reflected images) formed by the reflected light hardly experiences the after-image thereof.

In the present invention, application of voltage to the electrochromic coating or releasing the voltage application allows the electrochromic coating to be colored or discolored. This changes the optical transmittance of the electrochromic coating. For example, a reduction in the optical transmittance of the electrochromic coating at the time of incidence of light of high intensity will cause the amount of light reaching the reflecting film to be decreased and the amount of light reflected on the reflecting film reaching the glass substrate to be decreased. Accordingly, the entire reflecting mirror will have a reduced optical reflectance and thus the glare of images reflected on the reflecting mirror can be reduced at the side of the viewer.

Here, the optical reflectance of the entire reflecting mirror is affected by the surface optical reflectance. In addition, since light reflected on the surface has not reached the electrochromic coating, the entire reflecting mirror would have an optical reflectance higher than that of the surface reflection even when the amount of light transmission through the electrochromic coating is reduced.

However, in the present invention, the surface optical reflectance can be reduced to the same level as that of the glass substrate as described above. Thus, the optical reflectance provided by the electrochromic function to the entire reflecting mirror can be reduced to the same level as that of the glass substrate. This allows for making full use of the aforementioned anti-glare effect.

<First Embodiment>

Figure 2:
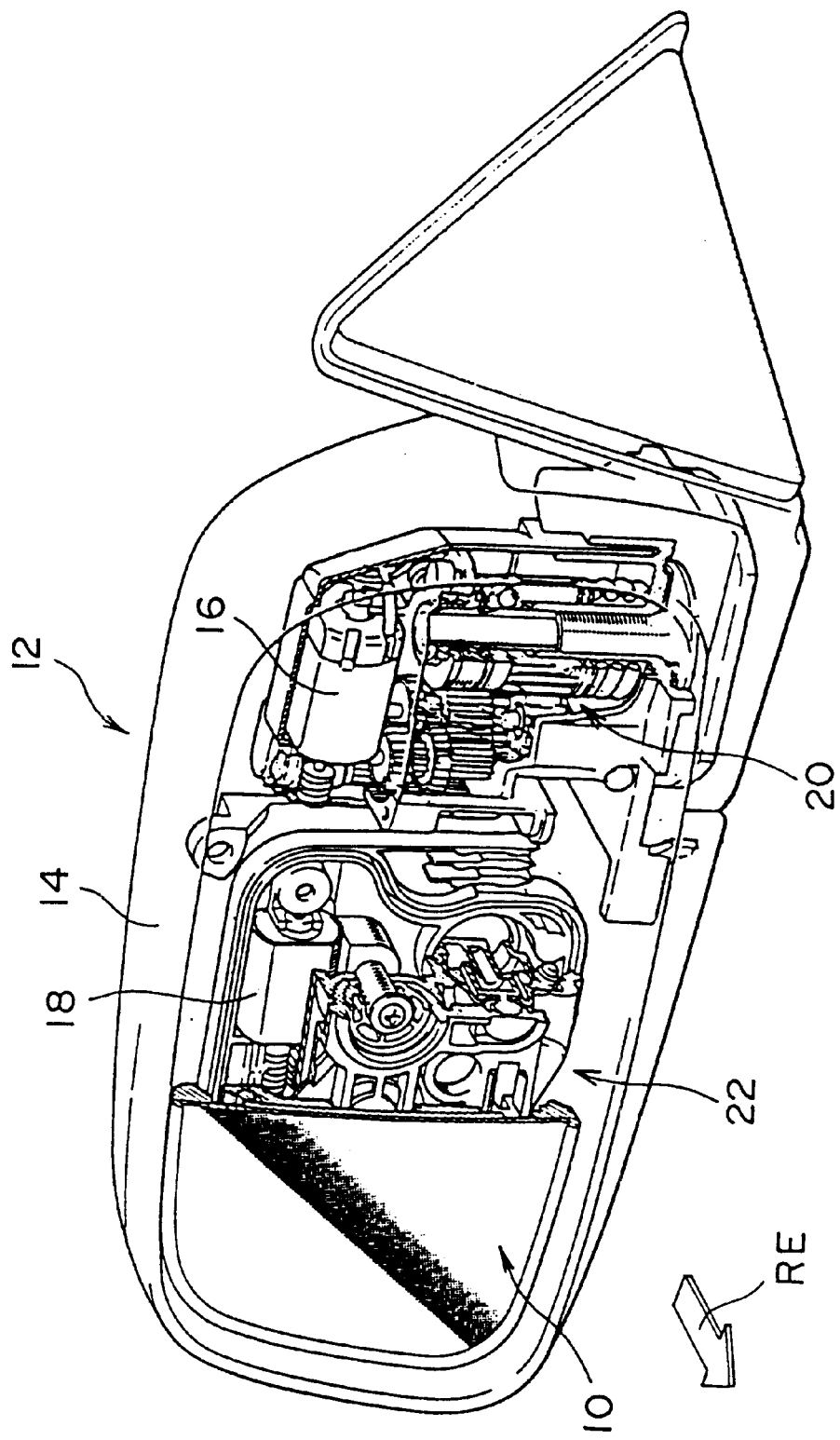
FIG. 2 is a perspective view showing a side mirror to which a reflecting mirror according to a first embodiment of the present invention is applied.

FIG. 2 is a perspective view showing a side mirror 12 to which a reflecting mirror 10 according to a first embodiment of the present invention is applied. FIG. 1 is a schematic cross-sectional view showing the configuration of the reflecting mirror 10.

As shown in FIG. 2, the side mirror 12 is provided with a housing 14 which is mounted on the outer side of the driver's seat and the outer side of a front passenger seat of a vehicle. The housing 14 has an opening with a recessed shape directed toward the rear (in the direction shown by arrow RE in FIG. 2) of the vehicle under normal conditions. Inside the housing 14, housed are a pair of horizontal swing motor 16 and vertical swing motor 18, a horizontal swing reduction mechanism 20 comprising a plurality of gears such as pinion gears, and vertical swing reduction mechanism 22. In addition, the reflecting mirror 10 is disposed at a position closer to the opening side of the housing 14 than the horizontal swing motor 16, the vertical swing motor 18, the horizontal swing reduction mechanism 20, and the vertical swing reduction mechanism 22. The reflecting mirror 10 is supported on the back side thereof by means of a supporting member that is mechanically coupled to the horizontal swing motor 16 via the horizontal swing reduction mechanism 20. The reflecting mirror 10 is also supported by means of another supporting member that is mechanically coupled to the vertical swing motor 18 via the vertical swing reduction mechanism 22. The aforementioned horizontal swing motor 16 and the vertical swing motor 18 are electrically coupled to switches (none of them are shown in the figure) provided inside the cabin of the vehicle via wiring such as cables. Actuating switches allows the reflecting mirror 10 to be swung within a predetermined range around an axis substantially along the horizontal direction of the vehicle as well as around an axis substantially along the vertical direction of the vehicle. This allows, for example, a passenger seated in the driver's seat of the vehicle to adjust the reflecting mirror 10 as appropriate so that the rear can be viewed easily.

FIG. 1 is a cross-sectional view showing a conceptual reflecting mirror 10. As shown in FIG. 1, the reflecting mirror 10 comprises a glass substrate 24. The glass substrate 24 has a direction of thickness substantially along the back and forth direction of the vehicle under normal conditions (which changes slightly, in more detail, depending on the rotational positions of the aforementioned horizontal swing motor 16 and vertical swing motor 18). The thickness T1 thereof is approximately 1 mm to 2 mm. Moreover, the glass substrate 24 is colorless and transparent to allow light to pass sufficiently therethrough.

A reflecting film 26 is formed on one surface in the direction of thickness of the glass substrate 24 (opposite to the arrow RE in FIG. 1). The reflecting film 26 is composed of chromium or made of an alloy predominantly composed of chromium on one surface in the direction of thickness of the glass substrate 24, with a thickness T2 thereof being approximately 35 nm. A surface at least on the side of glass substrate 24 of the reflecting film 26 formed on the glass substrate 24 has sufficiently high glossiness and high reflectance of light. Therefore, light incident on the glass substrate 24 from the side where the reflecting film 26 of the glass substrate 24 is formed is reflected by means of the reflecting film 26.

Furthermore, in this embodiment, the reflecting film 26 is composed of chromium or made of metal predominantly composed of chromium, however, the composition of the reflecting film 26 is not limited thereto. Other metals such as aluminum, silver, or alloys predominantly composed of these metals.

On the opposite side of the reflecting film 26 of the glass substrate 24, formed is a hydrophilic coating 28. The hydrophilic coating 28 is composed of silicon dioxide ($SiO_2$) with a thickness $T_3$ being approximately 15 nm. The transmittance of the light incident from the opposite side of the glass substrate 24 is substantially equivalent to that of the aforementioned glass substrate 24 and the light is allowed to pass sufficiently therethrough. In addition, the hydrophilic coating 28 has high wettability on the surface of at least the opposite side of the glass substrate 24, having a contact angle of 10° with a water droplet adhered on the surface thereof.

A photocatalytic coating 30 is formed between the hydrophilic coating 28 and the glass substrate 24. The photocatalytic coating 30 is predominantly composed of titanium dioxide ($TiO_2$), having a thickness $T_4$ of approximately 240 nm, allowing the light incident from the opposite side of the glass substrate 24 through the hydrophilic coating 28 to pass sufficiently therethrough. In addition, the photocatalytic coating 30 decomposes organic compounds adhered on the hydrophilic coating 28 through the photocatalytic reaction when light is impinged thereon.

Next, the action and effect of this embodiment will be explained.

The side mirror 12 to which the reflecting mirror 10 is applied allows the light from the rear of the vehicle to be transmitted through the hydrophilic coating 28, the photocatalytic coating 30, and the glass substrate 24, and then reflected on the reflecting film 26. The reflected image composed of the reflected light allows passengers to view the right and left rear of the vehicle.

Furthermore, as mentioned above, the reflecting mirror 10 has the hydrophilic coating 28 which allows the contact angle of a water droplet to be below 10°. This allows a water droplet adhered on the surface (that is, the surface of the hydrophilic coating 28) of the reflecting mirror 10 due to rain or the like not to remain in the shape of so-called particles but to spread in the shape of a thin film. This will prevent distortion of reflected images.

Furthermore, the photocatalytic coating 30 is provided on the side of the glass substrate 24 of the hydrophilic coating 28. The photocatalytic coating 30 decomposes, when receiving light, organic substances or the like adhered on the surface of the reflecting mirror 10, that is, of the hydrophilic coating 28 through the photocatalytic action thereof. The function of decomposing organic substances provided by the photocatalytic action allows, for example, organic substances contained in the exhaust gas of other vehicles and adhered on the surface of the hydrophilic coating 28 to be broken down. This never allows the hydrophilic property of the hydrophilic coating 28 to be impaired.

Figure 3:
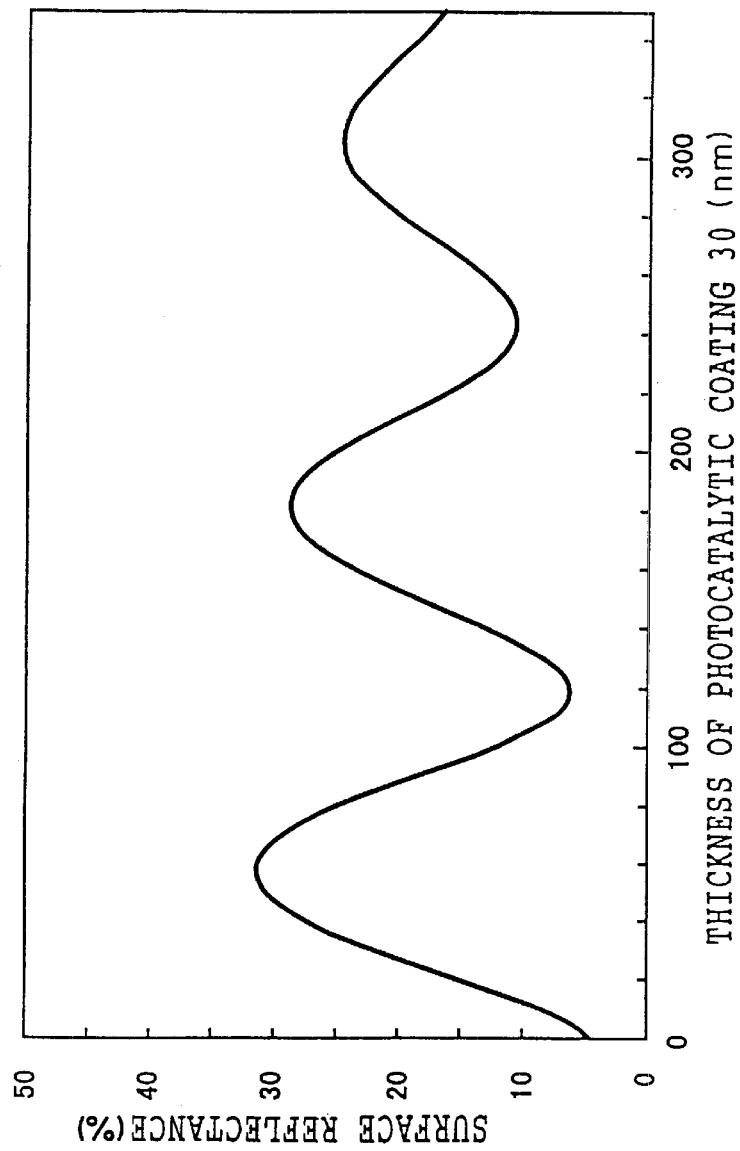
FIG. 3 is a graph showing the relationship between the thickness and surface reflectance of a photocatalytic coating predominantly composed of titanium dioxide.
Figure 4:
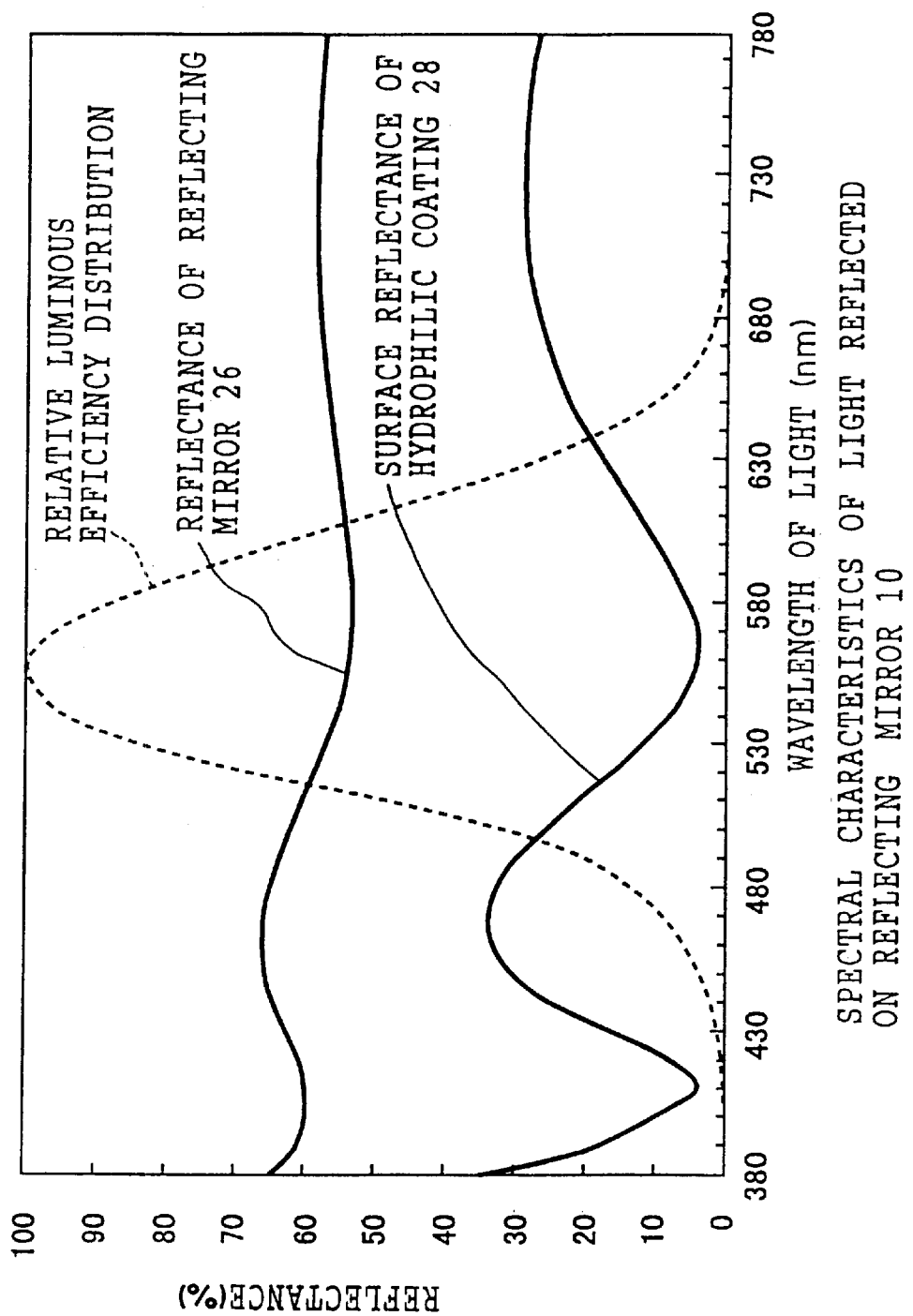
FIG. 4 is a graph showing spectral characteristics of light reflected on the surface of a mirror according to a first embodiment of the present invention and light reflected on the reflecting film.

FIG. 3 is a graph showing the relationship between the thickness of the photocatalytic coating 30 and the surface reflectance of the reflecting mirror 10. As shown in this graph, the surface reflectance has "valleys" at around 100 nm and 240 nm of thickness of the photocatalytic coating 30, where the surface reflectance is the lowest. In addition, FIG. 4 is a view showing the spectral characteristics of the reflected light from the reflecting film 26 and the surface reflected light from the hydrophilic coating 28, with the thickness of the photocatalytic coating 30 being 240 nm. Furthermore, in this figure, the relative luminous efficiency distribution is a distribution of sensitivity of human eyes for light with respective wavelengths. As shown in this figure, with the thickness of the photocatalytic coating 30 being 240 nm, the surface reflectance of the hydrophilic coating 28 within a range of wavelengths from approximately 550 nm to 580 nm, to which human eyes are most sensitive, is as low as around 5%. This allows the reflecting mirror 10 to have extremely low surface reflectance since the reflecting mirror 10 has the photocatalytic coating 30 of a thickness of 240 nm. This in turn reduces or prevents the formation of a double image caused by surface reflection.

Furthermore, as shown in the graph of FIG. 3, the surface reflectance has a "valley" at around the 100 nm of the thickness of the photocatalytic coating 30. Thus, making the thickness of the photocatalytic coating 30 around 100 nm can likewise reduce or prevent the formation of a double image. However, with a thickness of the photocatalytic coating 30 being below 200 nm, the wettability on the surface of the reflecting mirror 10 deteriorates due to a large contact angle of water droplets. That is, as described before, with the thickness of the photocatalytic coating 30 being below 200 nm, a sodium ingredient within glass diffuses into the photocatalytic coating 30, causing the photocatalytic action to deteriorate. Accordingly, this causes the contact angle of water droplets to become larger on the surface of the hydrophilic coating and thus prevents the full use of the function.

In contrast, the reflecting mirror 10, having a thickness of the photocatalytic coating 30 being 240 nm, allows the photocatalytic coating 30 to secure sufficiently the photocatalytic action, and the wettability of the surface of the reflecting mirror 10 can be secured.

Figure 5:
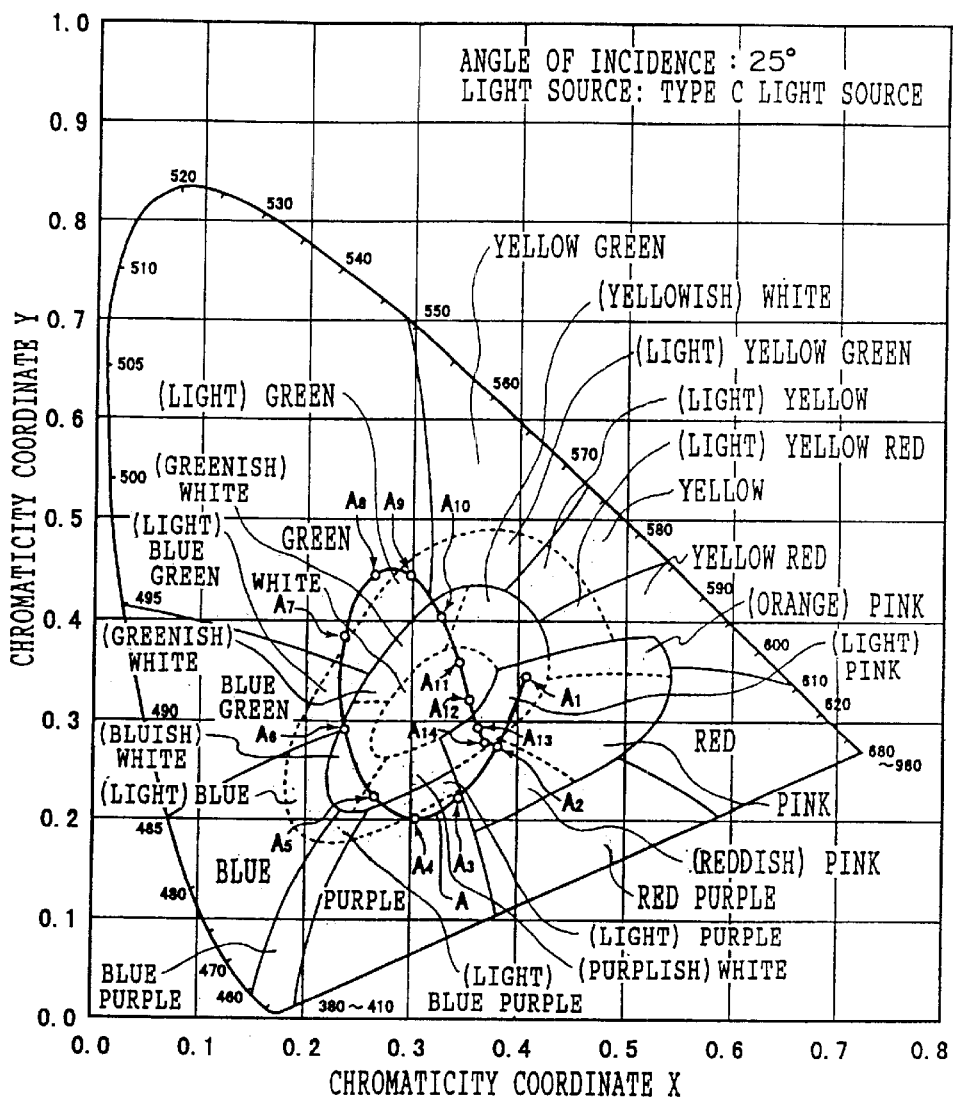
FIG. 5 is a graph showing the relationship between the thickness of photocatalytic coating and the chromaticity coordinates.

In addition, FIG. 5 is a view showing the relationship between the thickness of the photocatalytic coating 30 and the chromaticity coordinates of surface reflection. The chromaticity coordinates x and y in FIG. 5 are calculated based on the "method of expressing colors by means of the XYZ color space and $X_{10}Y_{10}Z_{10}$ color space", of which calculating method is not described in detail here.

In this figure, the solid line A, going from the point shown by arrow $A_1$ through the points shown by arrow $A_2$ and so on to the points shown by arrows $A_{13}$ and $A_{14}$, shows the relationship between the thickness of the photocatalytic coating and the chromaticity coordinates. Furthermore, the thickness of the photocatalytic coating is 200 nm at the point shown by arrow $A_1$, with the thickness thereof increased by 10 nm at each point.

As shown in this figure, it is found that those points on the side shown by arrow $A_1$ rather than by arrow $A_3$, that is, the photocatalytic coating of a thickness below 220 nm has a hue predominantly composed of red with the hue of surface reflection being pinkish.

For the wavelength of light, red has a longer wavelength and is greater in energy. Moreover, human eyes are more sensitive to red for a structural reason (more cells are present which are sensitive to red). When having viewed reflected light predominantly composed of red, the after-image of the light is apt to remain. Therefore, with the thickness of the photocatalytic coating being below 220 nm, an after-image would slightly remain even when the point of view is shifted from the reflecting mirror.

However, the reflecting mirror 10 has the photocatalytic coating 30 with a thickness of 240 nm, which allows most of surface reflected light to be white (see the point shown by arrow $A_4$ in FIG. 4). Accordingly, as mentioned above, the reflecting mirror 10 has very low surface reflection. Even if a reflected image by means of surface reflected light is viewed, such merit is available that an after-image is extremely little or no after-image remains.

Furthermore, this embodiment is so configured as to allow the photocatalytic coating 30 to have a thickness $T_4$ of 240 nm. However, from the points of view of securing the surface reflectance of the aforementioned reflecting mirror 10, the photocatalytic action of the photocatalytic coating 30, and reducing or preventing after-images caused by viewing reflected images carried by surface reflected light, the thickness of the photocatalytic coating 30 ranging from 220 nm to 280 nm would not impair the aforementioned effects.

Moreover, in this embodiment, the thickness $T_3$ of the hydrophilic coating 28 is 15 nm, however, the thickness $T_3$ of the hydrophilic coating 28 may be from 5 nm to 20 nm.

<Second Embodiment>

Next, other embodiments of the present invention will be explained. Furthermore, in the explanation of respective embodiments, reference numbers for those elements that are principally the same as those of said first embodiment and those preceding a current embodiment will remain the same without additional explanation.

Figure 6:
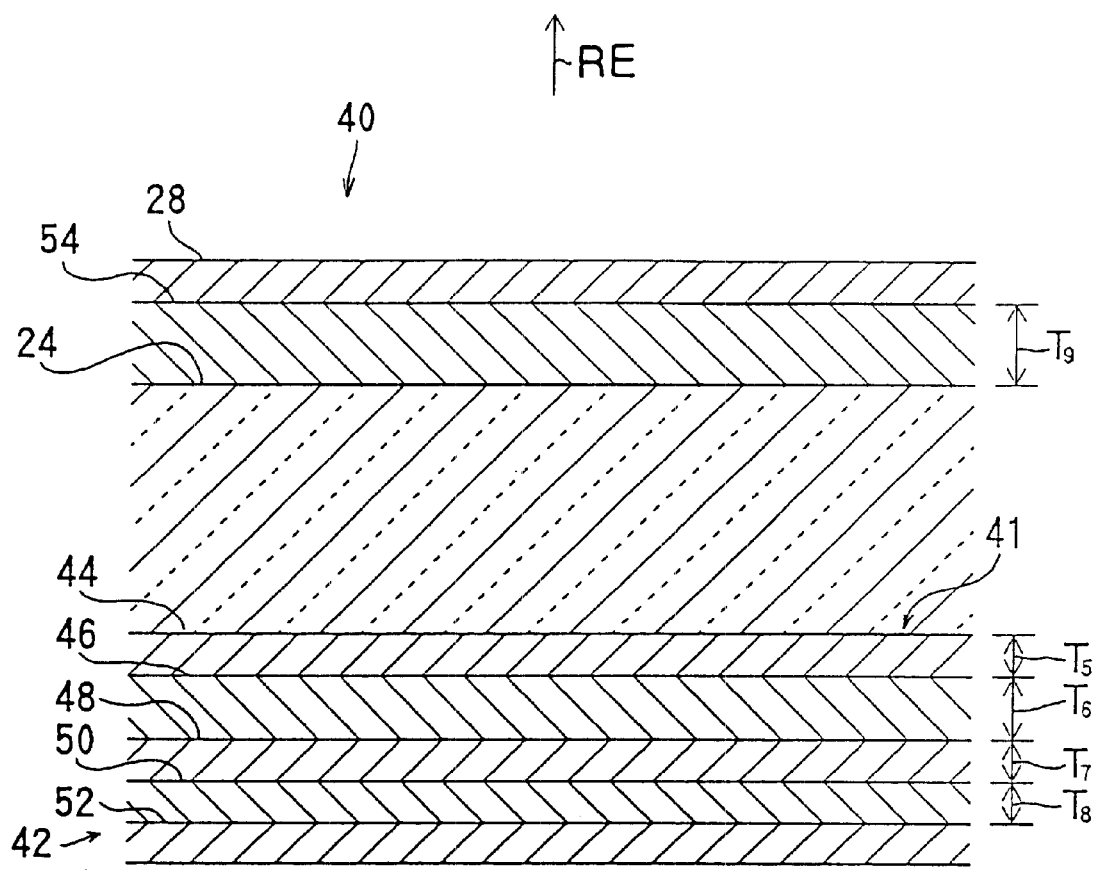
FIG. 6 is a schematic cross-sectional view showing the configuration of a reflecting mirror according to a second embodiment of the present invention.

FIG. 6 is a schematic cross-sectional view showing the configuration of a reflecting mirror 40 according to a second embodiment of the present invention. As shown in this figure, the reflecting mirror 40 is not provided with the reflecting film 26 but with a reflecting film 42 comprising an optical thin film 41 and a reflecting film body 52. The optical thin film 41 is provided with a titanium dioxide layer 44 of a thickness ($T_5$) of approximately 20 nm predominantly composed of titanium dioxide ($TiO_2$). The titanium dioxide layer 44 is disposed adjacent to the glass substrate 24. On the side of the titanium dioxide layer 44 opposite to the glass substrate 24, a silicon dioxide layer 46 is formed which is predominantly composed of silicon dioxide ($SiO_2$) and has a thickness ($T_6$) of approximately 120 nm. In addition, on the side of the silicon dioxide layer 46 opposite to the titanium dioxide layer 44, a titanium dioxide layer 48 is formed which is predominantly composed of titanium dioxide ($TiO_2$) and has a thickness ($T_7$) of approximately 80 nm. On the side of the titanium dioxide layer 48 opposite to the silicon dioxide layer 46, a silicon dioxide layer 50 is formed which is predominantly composed of silicon dioxide ($SiO_2$) and has a thickness ($T_8$) of approximately 20 nm. These titanium dioxide layers 44, 48, and the silicon dioxide layers 46, 50 selectively absorb light other than bluish light (that is, mainly light having wavelengths other than wavelengths ranging from 430 nm to 490 nm). Therefore, the light having passed through these layers 44 to 50 (that is, the optical thin film 41) will have a bluish color.

On the side of the silicon dioxide layer 50 opposite to the titanium dioxide layer 48, the reflecting film body 52 is formed that is predominantly composed of chromium (Cr). The light having passed through the glass substrate 24 and the aforementioned optical thin film 41 is reflected by means of the reflecting film body 52.

On the other hand, on the side of the glass substrate 24 opposite to the reflecting film 42, the hydrophilic coating 28 is formed in the same way as in said first embodiment. A photocatalytic coating 54 is formed between this hydrophilic coating 28 and the glass substrate 24. Like the photocatalytic coating 30 of said first embodiment, this photocatalytic coating 54 is predominantly composed of titanium dioxide. However, the thickness $T_9$ of the photocatalytic coating 54 is 260 nm while the thickness $T_4$ of the photocatalytic coating 30 is 240 nm.

In the reflecting mirror 40 configured as mentioned above, the light reflected by means of the reflecting film body 52 passes through the optical thin film 41 disposed between the reflecting film body 52 and the glass substrate 24. Thereby, the light other than bluish light (that is, mainly light having wavelengths other than wavelengths ranging from 430 nm to 490 nm) is selectively absorbed. Accordingly, when the reflected light from the reflecting mirror 40 is viewed, images formed by the light look bluish. The reason for this is the same as for that described in the first embodiment. That is, for the wavelength of light, red has a longer wavelength and is greater in energy. Moreover, human eyes are more sensitive to red for a structural reason (more cells are present which are sensitive to red). When having viewed reflected light predominantly composed of red, the after-image of the light is apt to remain. However, the light reflected by the reflecting mirror 40 is blue with a short wavelength and thus low energy, providing a less stimulus to human eyes. Therefore, after-images will hardly remain even when images formed by the light reflected by the reflecting mirror 40 are viewed.

A reflecting mirror in which the reflected light predominantly composed of bluish colors, as mentioned above, is allowed to provide less after-images is so-called the blue mirror, which has been in use conventionally. However, forming of the hydrophilic coating and the photocatalytic coating on the glass substrate 24 would cause interference to occur between the light reflected on the surface of the hydrophilic coating or the like and the light reflected on the reflecting film body 52. Consequently, it is possible for the hue of the light reflected on the reflecting film body 52 to change.

Figure 7:
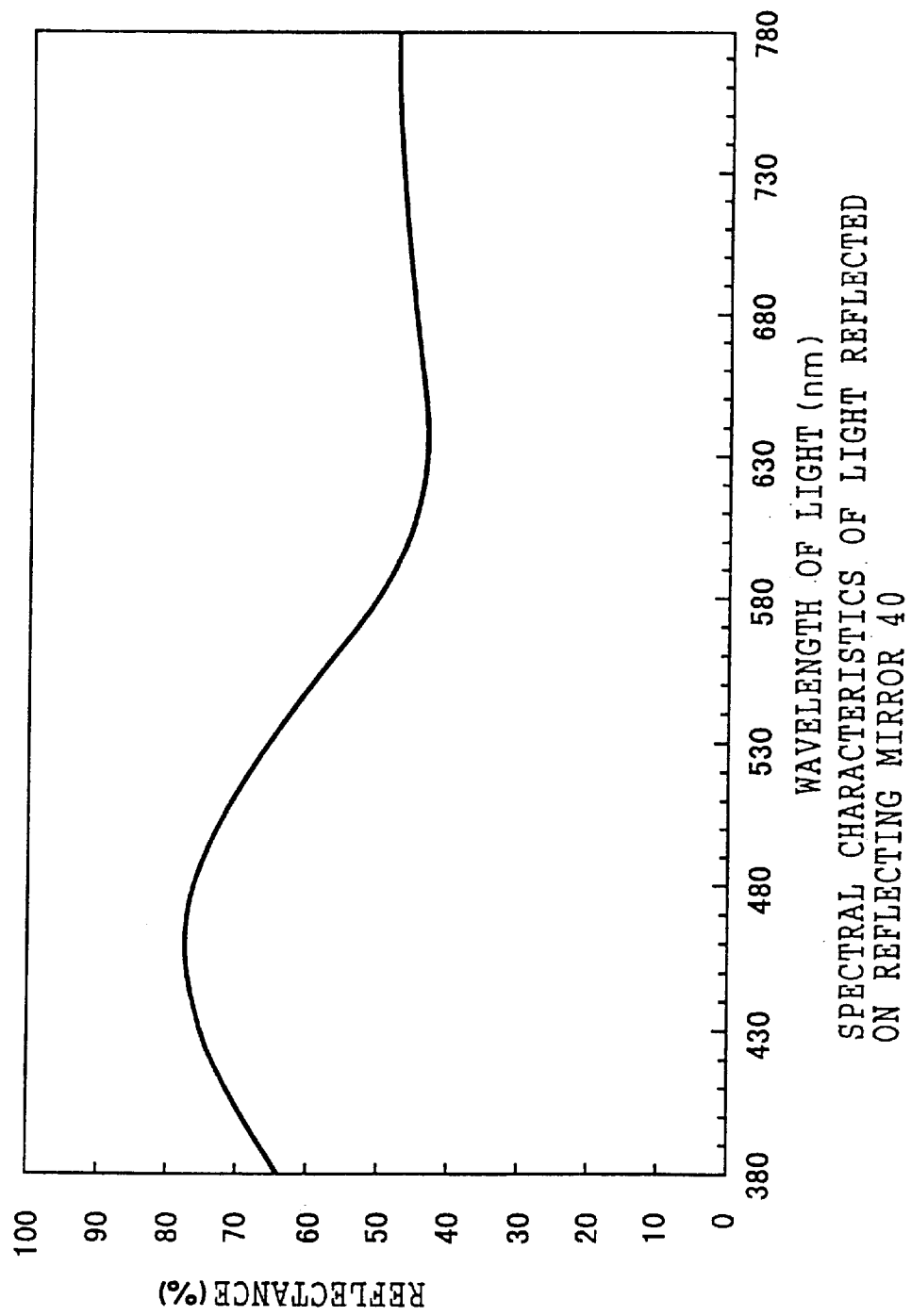
FIG. 7 is a graph showing the spectral characteristics of light reflected on a reflecting film of a reflecting mirror according to a second embodiment of the present invention.

However, as shown in the chromaticity coordinates of FIG. 5, with the thickness of the photocatalytic coating 54 being approximately 260 nm (the point shown by arrow $A_7$ of FIG. 5), the color of the surface reflection is substantially greenish. As such, the surface reflected light from the hydrophilic coating 28 is greenish with less amount of reddish color having a long wavelength. Accordingly, interference between the reflected light and the reflected light from the reflecting film body 52 would not cause the reflected light from the reflecting film body 52 to become reddish. Accordingly, as shown in FIG. 7, the spectral characteristics of the reflected light from the reflecting film body 52 after the interference of the surface reflected light from the hydrophilic coating 28 show an optical reflectance as high as 80% in the range of wavelength of approximately 460 nm. However, the optical reflectance in the range of wavelength of 580 nm or greater is as low as 45% to 60%. This shows that the reflected light from the reflecting film body 52 after the interference with the surface reflected light from the hydrophilic coating 28 has occurred contains less light of reddish colors with longer wavelengths and the reflected light is comparatively bluish. Therefore, even when an image formed by the reflected light from the reflecting mirror 40 is viewed, the after-image hardly remain.

Furthermore, the reflecting mirror 40 has the photocatalytic coating 54 with a thickness $T_9$ ranging from 220 nm to 280 nm. Thus, as said first embodiment, the reflecting mirror 40 maintains the same hydrophilic property by means of the hydrophilic coating 28 and the hydrophilic property of the hydrophilic coating 28 by means of the photocatalytic action of the photocatalytic coating 54.

Moreover, in this embodiment, the photocatalytic coating 54 is 260 nm in thickness. However, as shown in the chromaticity coordinates of FIG. 5, the color of the light reflected on the surface of the hydrophilic coating 28 would be bluish with the photocatalytic coating 54 being 240 nm or greater in thickness $T_9$. Therefore, in addition to this, by considering the maintenance of the hydrophilic property of the hydrophilic coating 28 provided by the photocatalytic property, the thickness $T_9$ of the photocatalytic coating 54 being from 240 nm to 280 nm would maintain the hydrophilic property of the hydrophilic coating 28 provided by the photocatalytic action. In addition, the color of the reflected light from the reflecting film body 52 can be kept bluish.

<Third Embodiment>

Next, a third embodiment of the present invention will be described.

Figure 8:
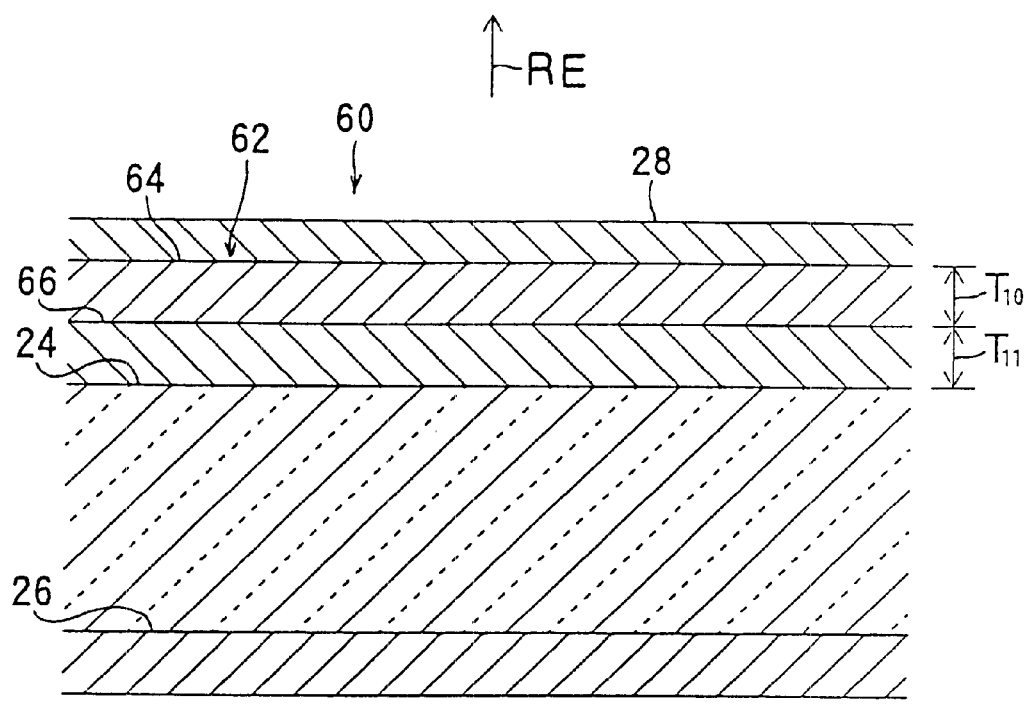
FIG. 8 is a schematic cross-sectional view showing the configuration of a reflecting mirror according to a third embodiment of the present invention.

FIG. 8 is a cross-sectional view showing a reflecting mirror 60 according to the third embodiment of the present invention. As shown in this figure, the reflecting mirror 60 has a photocatalytic coating 62 formed on the side of the hydrophilic coating 28 closer to the glass substrate 24. In said first embodiment, the photocatalytic coating 30 has a layer predominantly composed of titanium dioxide with the thickness of approximately 240nm. However, the photocatalytic coating 62 of the reflecting mirror 60 comprises a photocatalytic coating 64 and a sodium diffusion limiting coating 66. The photocatalytic coating 64 is predominantly composed of titanium dioxide with the thickness (T10) of approximately 130 nm, disposed in contact with the hydrophilic coating 28.

On the other hand, the sodium diffusion limiting coating 66 is predominantly composed of silicon dioxide with the thickness ($T_{11}$) of approximately 100 nm, disposed on the side of the glass substrate 24 closer to the photocatalytic coating 64.

In this embodiment, the sodium diffusion limiting coating 66 is formed between the photocatalytic coating 64 and the glass substrate 24. Consequently, a sodium ingredient contained in the glass substrate 24 is prevented by means of the sodium diffusion limiting coating 66 from reaching the photocatalytic coating 64. Accordingly, the photocatalytic coating 64 made conventionally as thick as 300 nm in consideration of the diffusion of the sodium ingredient can be made sufficiently as thin as 100 nm, as mentioned above, to make full use of photocatalytic action of the photocatalytic coating 64.

Figure 9:
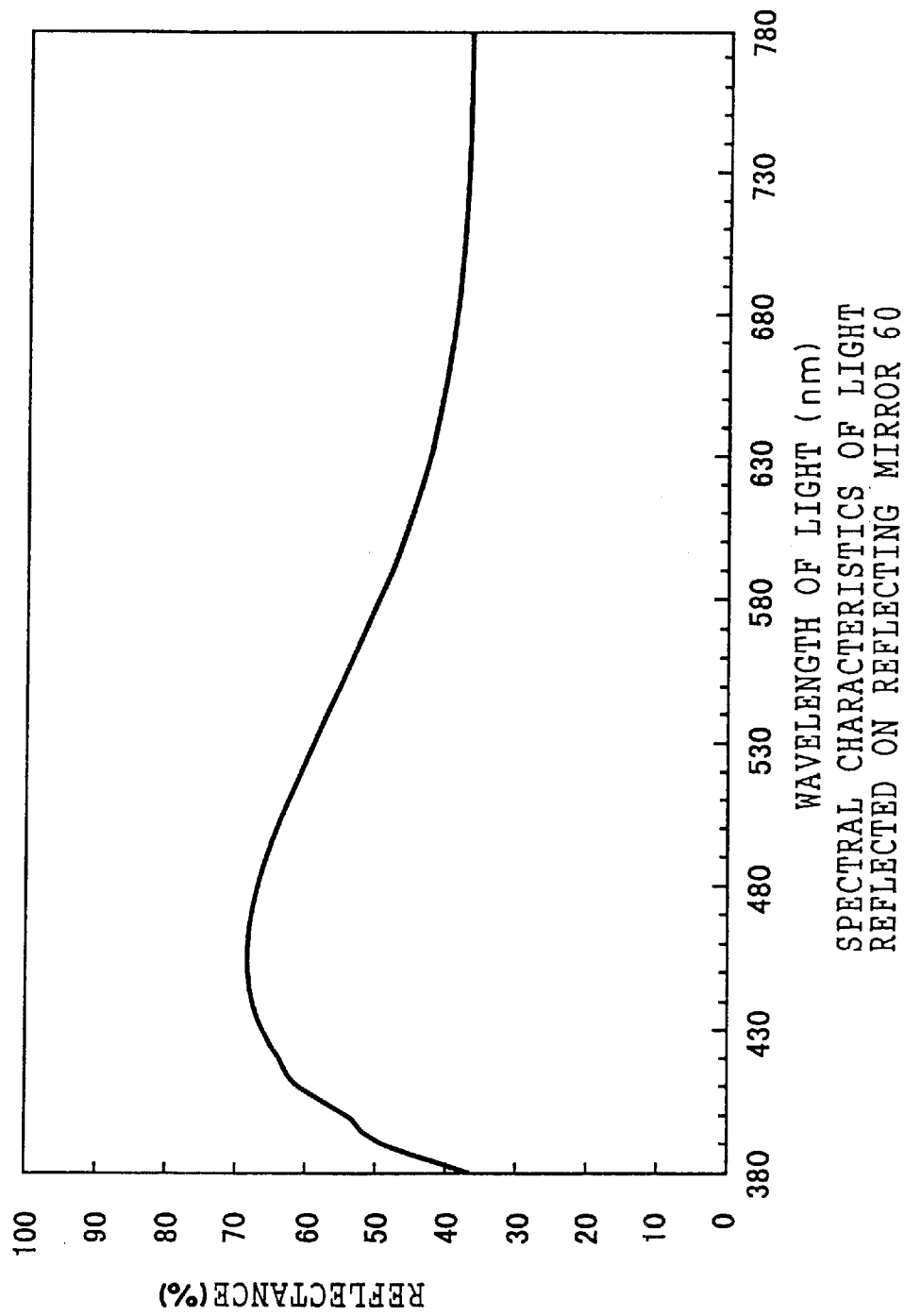
FIG. 9 is a graph showing the spectral characteristics of light reflected on a reflecting film of a reflecting mirror according to a third embodiment of the present invention.

Moreover, in the reflecting mirror 60, the photocatalytic coating 64 predominantly composed of titanium dioxide is made approximately 130 nm in thickness and the sodium diffusion limiting coating 66 predominantly composed of silicon dioxide is made approximately 100 nm in thickness. Accordingly, as shown in FIG. 9, this allows the spectral characteristics of the reflected light from the reflecting mirror 60 to be as high as approximately 60% in optical reflectance of the light of a wavelength approximately 450 nm. On the other hand, the optical reflectance of the light of a wavelength of 550 nm or greater is as low as 40%. This also shows that the reflected light from the reflecting film body 52 after the interference with the surface reflected light from the hydrophilic coating 28 has occurred contains less light of reddish colors with longer wavelengths and the reflected light is comparatively bluish. Therefore, even when an image formed by the reflected light from the reflecting mirror 60 is viewed, the after-image hardly remain.

Furthermore, in this embodiment, the photocatalytic coating 64 is approximately 130 nm in thickness $T_{10}$, however, the photocatalytic coating 64 may be from 110 nm to 140 nm in thickness $T_{10}$. Moreover, in this embodiment, the sodium diffusion limiting coating 66 is approximately 100 nm in thickness $T_{11}$, however, the sodium diffusion limiting coating 66 may be 80 nm or greater in thickness $T_{11}$.

Figure 10:
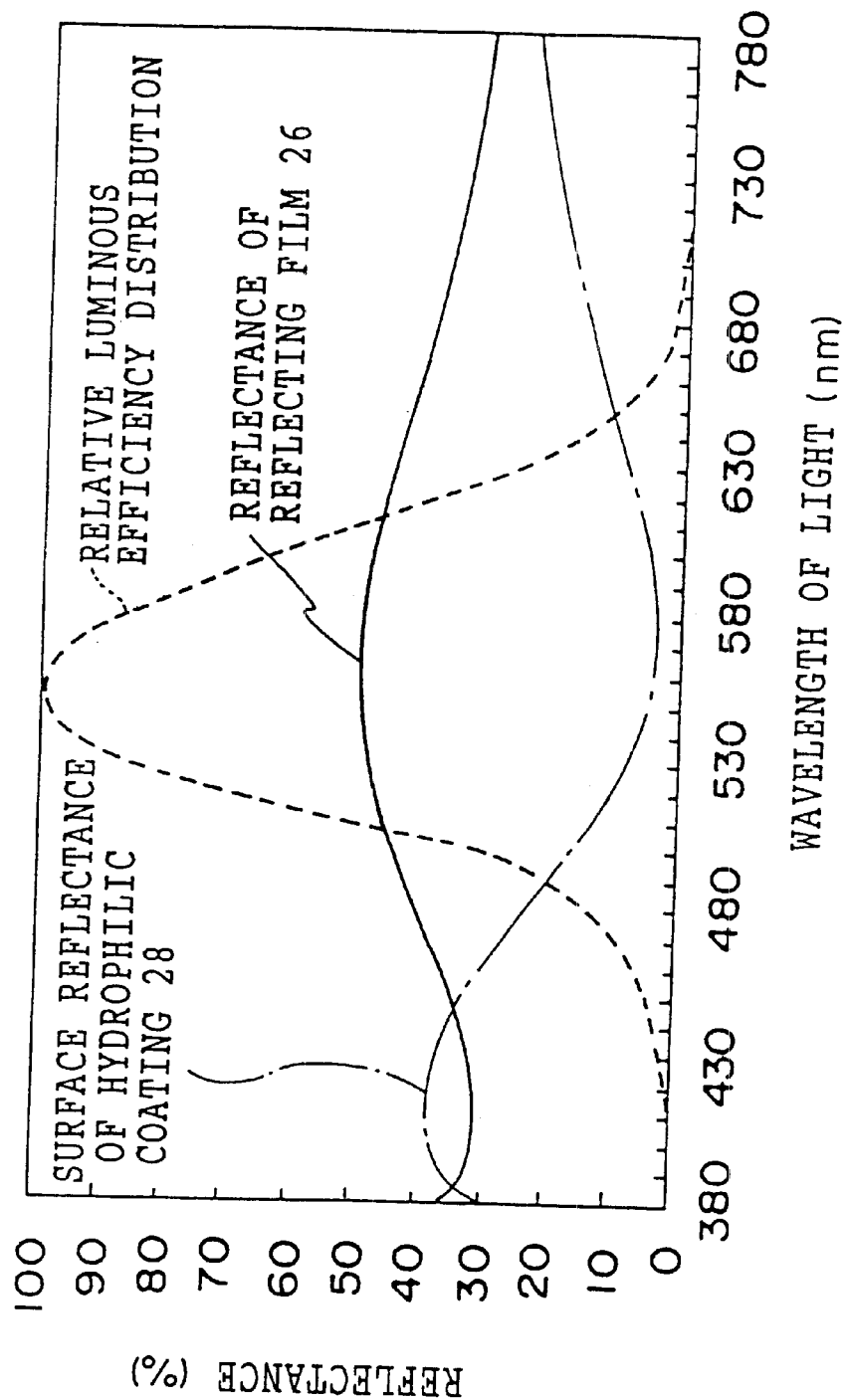
FIG. 10 is a graph showing the reflectance of the reflecting film for each wavelength of light on a reflecting mirror according to the third embodiment of the present invention and the reflectance of the surface of a hydrophilic coating.
Figure 11:
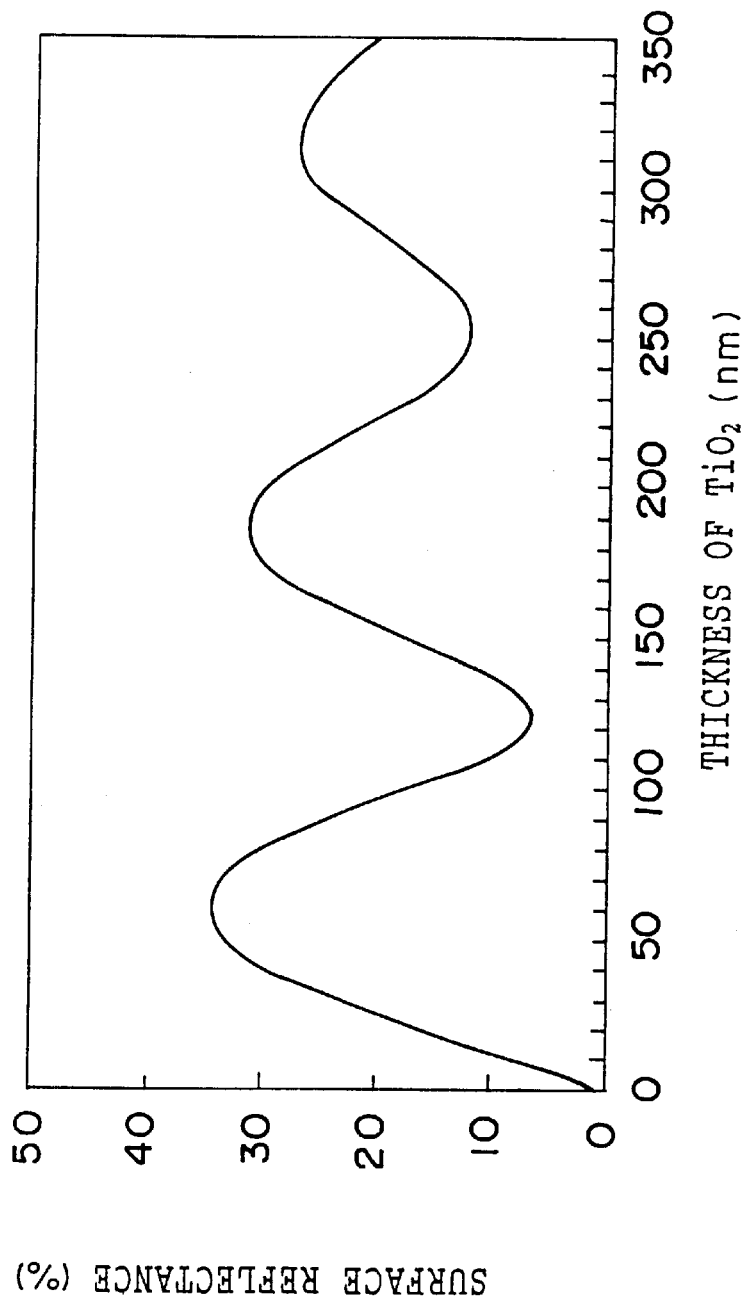
FIG. 11 is a graph showing the relationship between the thickness of titanium dioxide and the surface reflectance.
Figure 12:
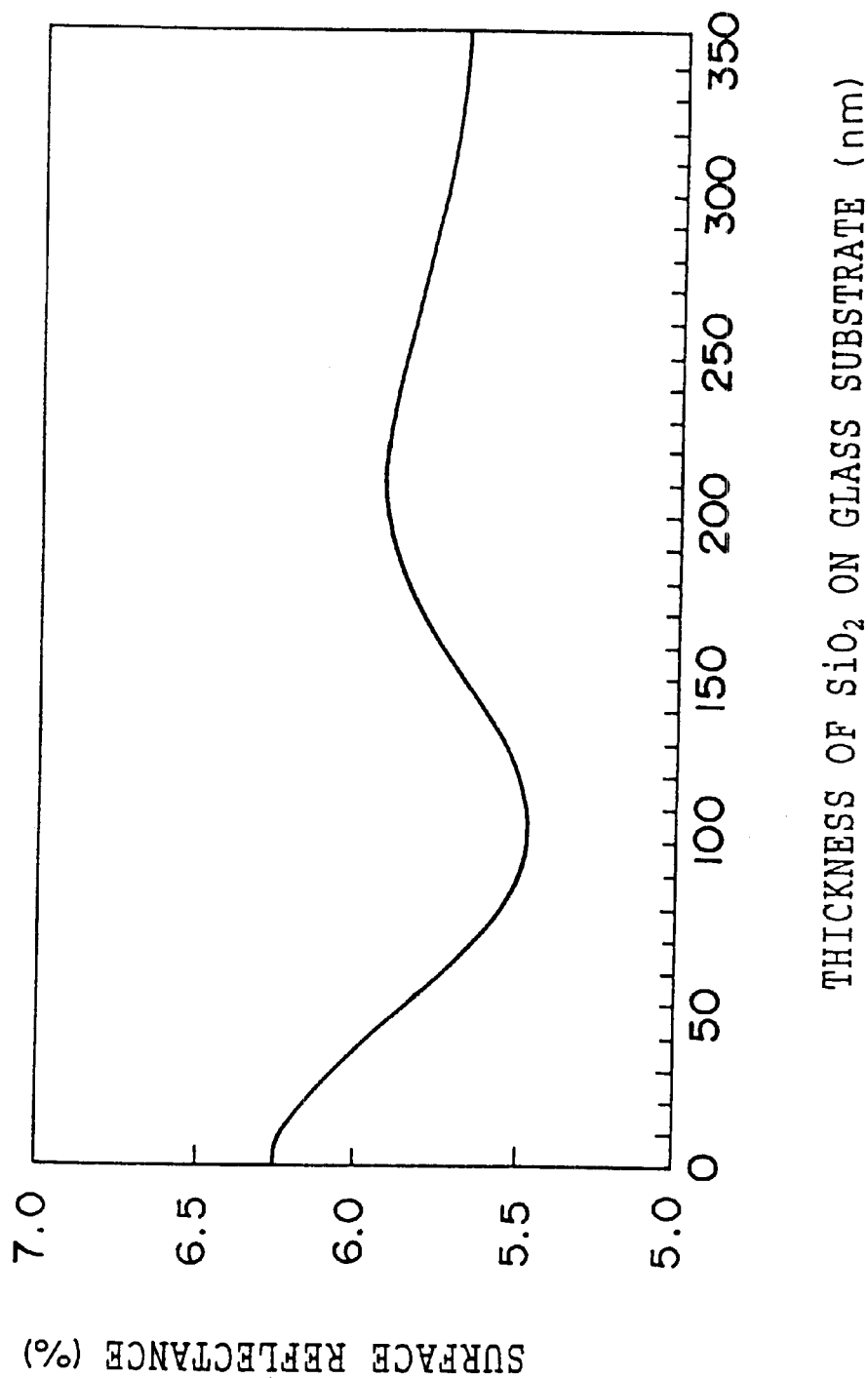
FIG. 12 is a graph showing the relationship between the thickness of silicon dioxide and the surface reflectance.

That is, as shown in FIG. 11, the surface optical reflectance of the photocatalytic coating 64 predominantly composed of titanium dioxide differs depending on the thickness, being the lowest at around 120 nm. On the other hand, as shown in FIG. 12, the surface optical reflectance of the sodium diffusion limiting coating 66 differs depending on the thickness, being the lowest at around 100 nm. Therefore, the photocatalytic coating 64 and the sodium diffusion limiting coating 66 may be formed at the portion where the surface optical reflectance of the both becomes the lowest. This allows the surface optical reflectance of the hydrophilic coating 28 to be reduced even with a greater entire thickness of the photocatalytic coating 64 and the sodium diffusion limiting coating 66. This allows the optical reflectance of the surface of the hydrophilic coating 28 within the range of wavelength of approximately 550 nm, where human eyes are said to be most sensitive, to be reduced to approximately 6.6% (see the graph of FIG. 10). This allows most of the reflected images from the reflecting mirror 60 to derive from the light reflected on the surface of the reflecting film 26. Thereby, formation of double images caused by images produced by the reflected light from the surface of the reflecting film 26 and by those produced by the reflected light from the surface of the hydrophilic coating 28 can be reduced or prevented.

<Fourth Embodiment>

Next, a fourth embodiment of the present invention will be explained.

Figure 13:
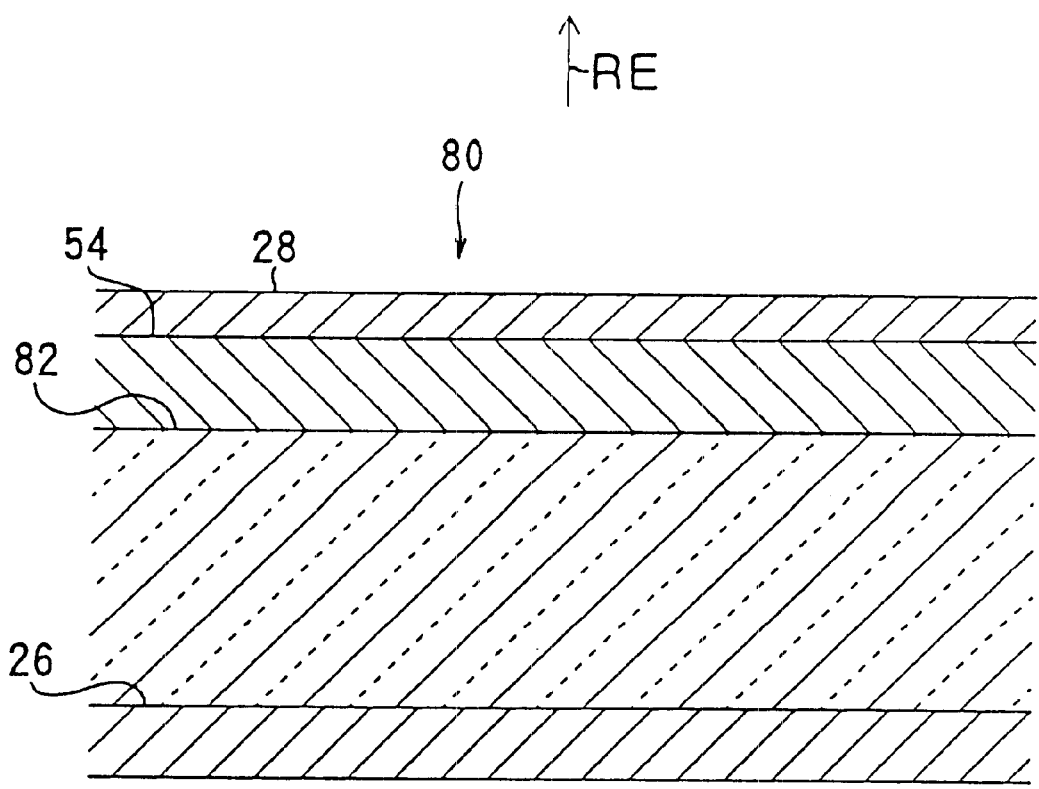
FIG. 13 is a schematic cross-sectional view showing the configuration of a reflecting mirror according to a fourth embodiment of the present invention.

FIG. 13 is a cross-sectional view showing a reflecting mirror 80 according to the fourth embodiment of the present invention. As shown in this figure, the reflecting mirror 80 has principally the same configuration as that of the reflecting mirror 10 according to said first embodiment but is provided with a glass substrate 82 in place of the glass substrate 24. The glass substrate 82 is originally transparent, however, colored in bluish or greenish color as a whole. Accordingly, when light passes through the glass substrate 82, light having such a wavelength as bluish or greenish color is absorbed, so that the transmitted light becomes bluish or greenish.

Also in the reflecting mirror 80 configured as mentioned above, the configuration of the photocatalytic coating 54 and the hydrophilic coating 28 is the same as that of the second embodiment. Since the surface reflected light is bluish with a short wavelength, this allows after-images to hardly remain when images formed by means of the surface reflected light.

Figure 14:
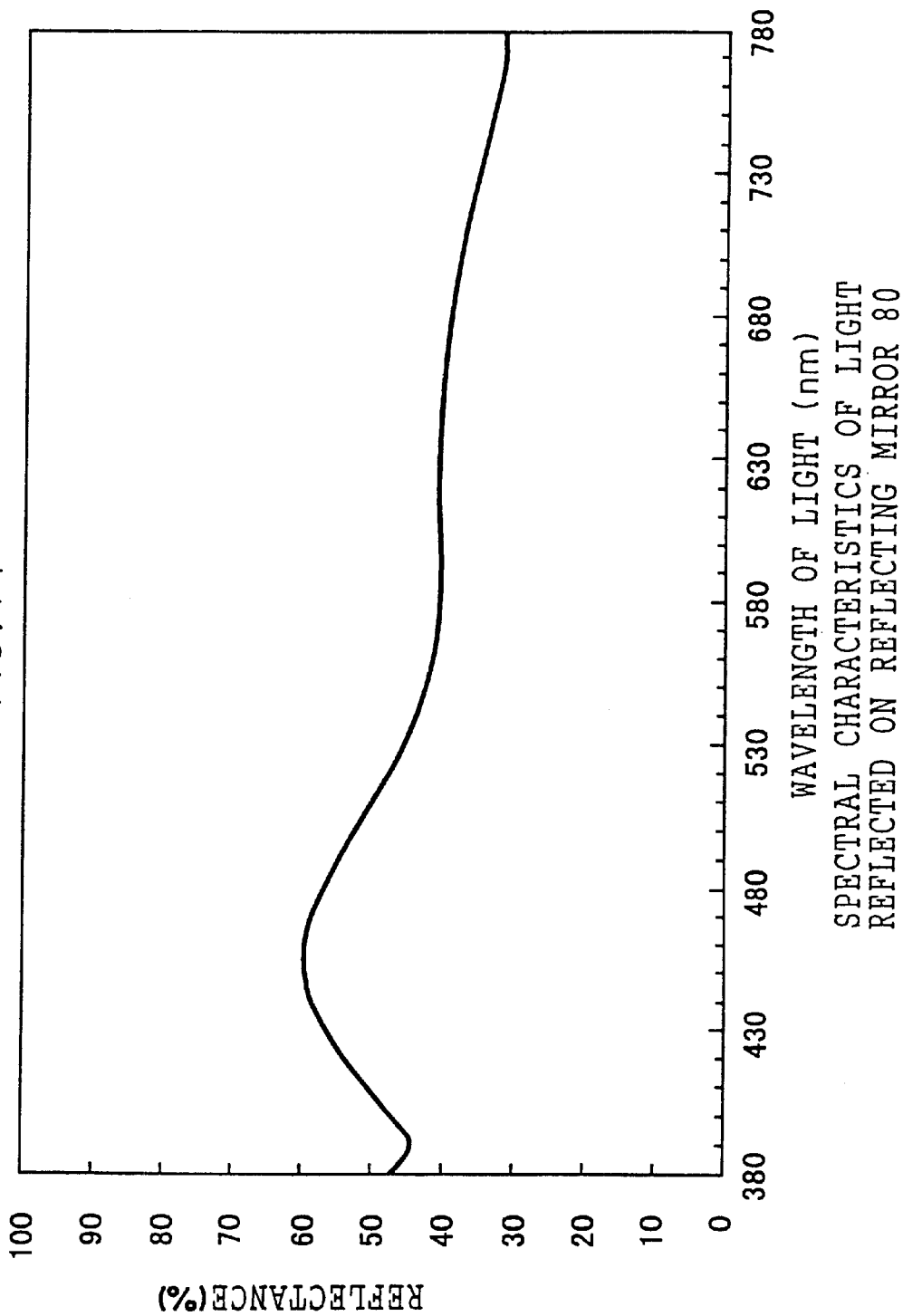
FIG. 14 is a graph showing the spectral characteristics of light reflected on a reflecting film of a reflecting mirror according to a fourth embodiment of the present invention.

Furthermore, as shown in FIG. 14, the spectral characteristics of the reflected light from the reflecting film 26 after interference has occurred to the reflected light shows that optical reflectance is approximately 60% at a wavelength of approximately 450 nm. In contrast to this, the optical reflectance is approximately 40% or less at a wavelength of approximately 550 nm or greater. That is, this shows that the reflected light from the reflecting film 26 after the interference with the surface reflected light from the hydrophilic coating 28 has occurred contains less light of reddish colors with longer wavelengths and the reflected light is comparatively bluish. Therefore, even when an image formed by the reflected light from the reflecting mirror 80 is viewed, the after-image hardly remain.

<Fifth Embodiment>

Next, a fifth embodiment of the present invention will be explained.

Figure 15:
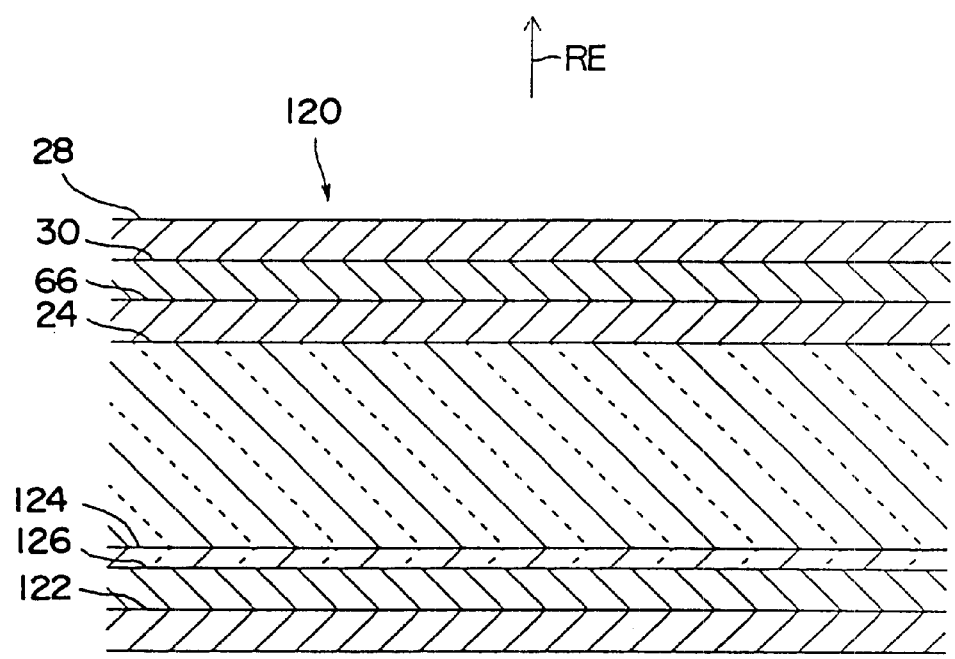
FIG. 15 is a schematic cross-sectional view showing the configuration of a reflecting mirror according to a fifth embodiment of the present invention.

FIG. 15 is a schematic cross-sectional view showing the configuration of a reflecting mirror 120 according to the fifth embodiment of the present invention. As shown in this figure, on the back side of the glass substrate 24 (that is, opposite to the hydrophilic coating 28), a conductive reflecting film 122 is formed in place of the reflecting film 26. Like the reflecting film 26 in principle, this conductive reflecting film 122 has a high-gloss surface on the side closer to the glass substrate 24. In addition, the conductive reflecting film 122 has a high optical reflectance and is capable of reflecting the light incident on the glass substrate 24 from the side opposite to the side where the reflecting film 26 of the glass substrate 24 is formed, by means of the conductive reflecting film 122. Furthermore, the conductive reflecting film 122 is electrically coupled to a battery via electrodes, lead wires, and a switch (none of them are shown in the figure).

In addition, a transparent conductive coating 124 is formed between the glass substrate 24 and the conductive reflecting film 122. Like the conductive reflecting film 122, this conductive coating 124 is also electrically coupled to a battery via electrodes, lead wires, and a switch (none of them are shown in the figure).

There is formed an electrochromic coating 126 between the conductive coating 124 and the conductive reflecting film 122. The electrochromic coating 126 is formed by means of laminating in three layers three types of films, for example, oxide coupler coating such as iridium oxide or nickel oxide, solid electrolyte coating such as tantalum pentaoxide, and reductive color coupler coating such as tungsten trioxide or molybdenum trioxide. Application of voltage to the conductive reflecting film 122 and the conductive coating 124 via the aforementioned electrodes will cause the electrochromic coating 126 to be colored or discolored (that is, coloring is released) through reversible oxidation and reduction reaction.

Like the reflecting mirror 60 according to said third embodiment, the reflecting mirror 120, configured as described above, is provided with the hydrophilic coating 28, the photocatalytic coating 64, and the sodium diffusion limiting coating 66. Accordingly, the reflecting mirror 60 provides the same action and effect as those of said third embodiment. Furthermore, in the reflecting mirror 120 comprising the aforementioned conductive reflecting film 122, conductive coating 124, and the electrochromic coating 126, voltage can be applied to the conductive reflecting film 122 and the conductive coating 124 via electrodes to allow the electrochromic coating 126 to be colored or discolored. This will change the amount of transmission of light incident on the electrochromic coating 126 from the side of the glass substrate 24. This will also change the amount of transmission of the light, at the electrochromic coating 126, transmitted from the electrochromic coating 126 and reflected on the conductive reflecting film 122. This will cause the optical reflectance of the light transmitted up to the conductive reflecting film 122 to change. For example, where light of high intensity is incident on the reflecting mirror 120, it is possible to prevent glare by reducing the optical reflectance of the light transmitted up to the conductive reflecting film 122.

Even with the reflecting mirror 120 having the anti-glare effect, the optical reflectance on the surface thereof, that is, on the surface of the hydrophilic coating 28 cannot be changed. Accordingly, the reflecting mirror 120 is not allowed as a whole to have an optical reflectance less than that of the hydrophilic coating 28 on the surface thereof. However, as described in said third embodiment, the reflecting mirror 120 is allowed to have the photocatalytic coating 66 as thin as approximately 100 nm. Accordingly, this allows the optical reflectance on the surface of the hydrophilic coating 28 to be reduced to approximately 6.6%. Therefore, the reflecting mirror 120 is capable of reducing the entire optical reflectance of the reflecting mirror 120 by means of coloring the electrochromic coating 126 sufficiently to make full use of the aforementioned anti-glare effect.

<Sixth Embodiment>

Next, a sixth embodiment of the present invention will be explained.

Figure 16:
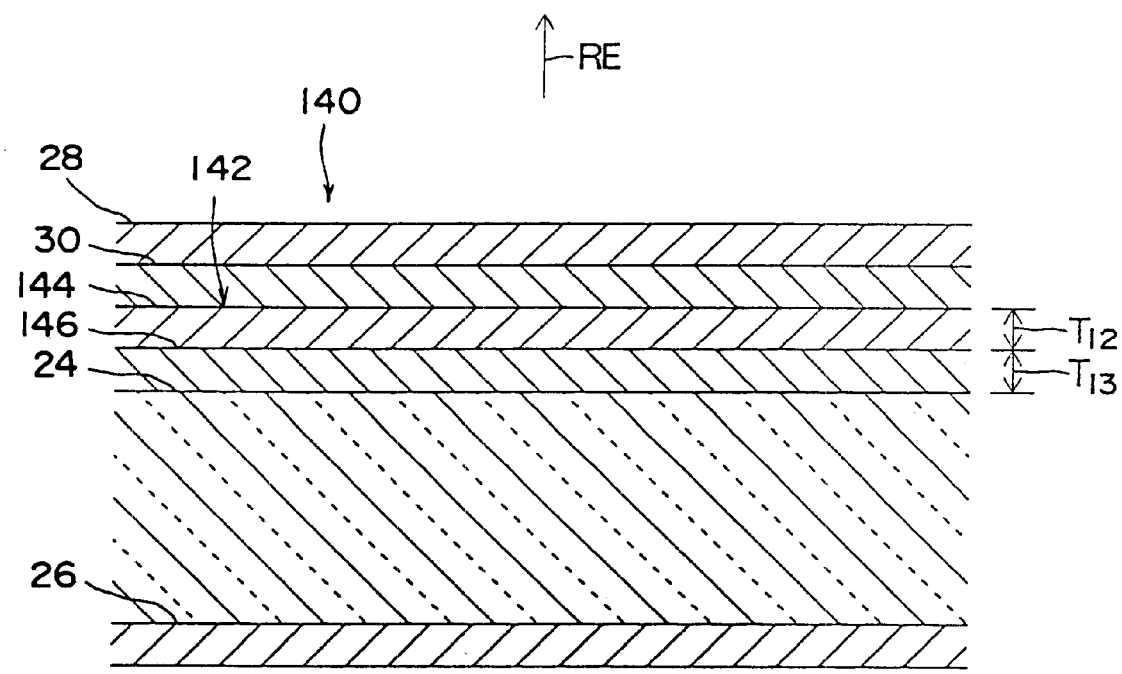
FIG. 16 is a schematic cross-sectional view showing the configuration of a reflecting mirror according to a sixth embodiment of the present invention.

FIG. 16 is a schematic cross-sectional view showing a reflecting mirror 140 according to the sixth embodiment of the present invention. As shown in this figure, unlike the reflecting mirror 60 according to said third embodiment, the reflecting mirror 140 is not provided with the sodium diffusion limiting coating 66. In place thereof, the reflecting mirror 140 is provided with a sodium diffusion limiting coating 142. The sodium diffusion limiting coating 142 is provided with a silicon dioxide layer 144 that is located relatively closer to the side of the photocatalytic coating 30. Like the sodium diffusion limiting coating 66 of the reflecting mirror 60 according to said third embodiment, the silicon dioxide layer 144 is predominantly composed of silicon dioxide with the thickness T12 thereof being approximately 80 nm. In addition, the sodium diffusion limiting coating 142 comprises a titanium dioxide layer 146 disposed between the silicon dioxide layer 144 and the glass substrate 24. The titanium dioxide layer 146 is predominantly composed of titanium dioxide with the thickness T13 thereof being approximately 125 nm. As can be seen from FIGS. 11 and 12, the thickness of the silicon dioxide layer 144 and the titanium dioxide layer 146 lies in the range that provides the lowest surface optical reflectance on the hydrophilic coating 28.

Figure 17:
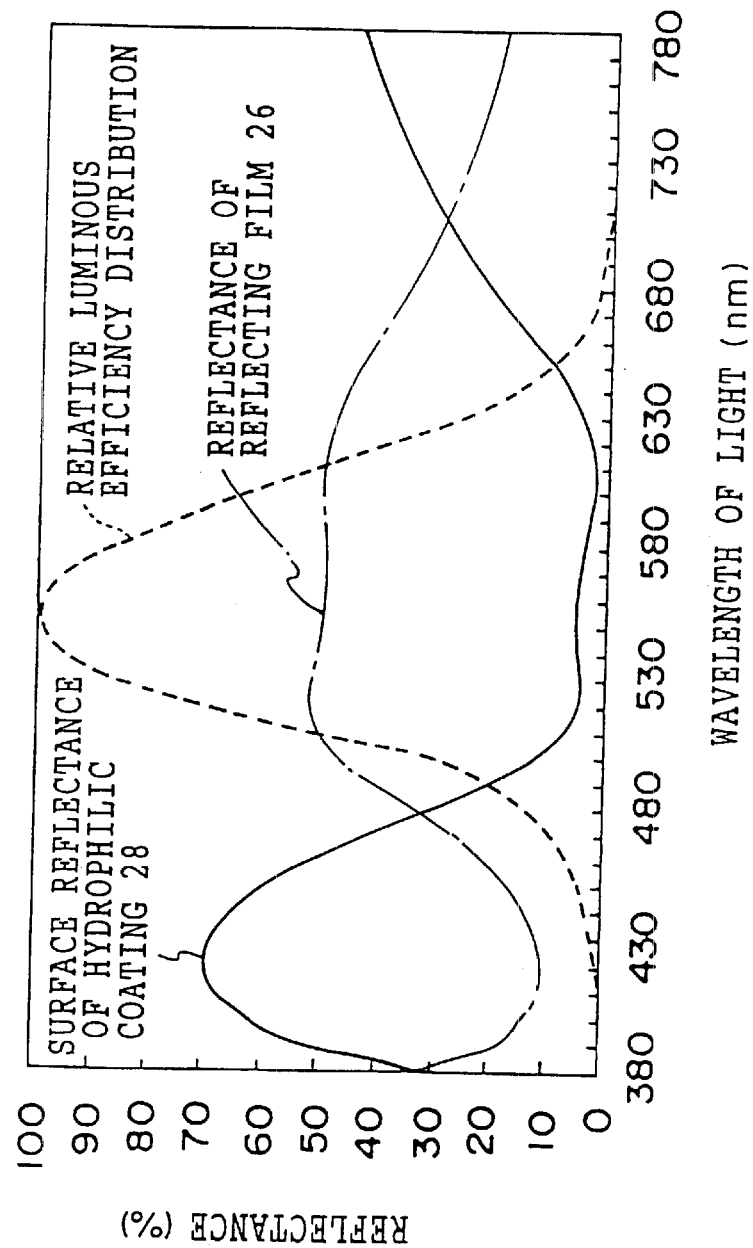
FIG. 17 is a graph showing the reflectance of the reflecting film for each wavelength of light on a reflecting mirror according to the sixth embodiment of the present invention and the reflectance of the surface of a hydrophilic coating.

FIG. 17 is a graph showing the optical reflectance of the reflecting mirror 140 for respective wavelengths. As shown in this graph, the optical reflectance on the surface of the hydrophilic coating 28 is 5.1% within a wavelength region of 555 nm that provides the best sensitivity to human eyes. This optical reflectance is very close to that (5.3%) of the glass substrate 24 and has a further reduced optical reflectance compared with that (6.6%) of the hydrophilic coating 28 of the reflecting mirror 60 according to said third embodiment. Therefore, the reflecting mirror 120 reduces or prevents double images more effectively than ever.

Furthermore, as can be seen from the comparison of FIG. 10 with FIG. 17, the optical reflectance on the surface of the hydrophilic coating 28 in the wavelength range from 520 nm to 620 nm is substantially the same. Comparison with the optical reflectance on the surface of the hydrophilic coating 28 of the reflecting mirror 60 according to said third embodiment tells that the shape of the graph is flat over the range of wavelength from the 520 nm to 620 nm. Furthermore, overlap the optical reflectance on the surface of the hydrophilic coating 28 of the reflecting mirror 60 and the reflecting mirror 140 to the relative luminous efficiency distribution that shows the level of sensitivity of the human eye for respective wavelengths. This tells that the reflecting mirror 140 provides an approximately 5% of optical reflectance on the surface of the hydrophilic coating 28 over substantially entire region of wavelengths that provides good sensitivity to the human eye. (That is, the reflecting mirror 140 provides a reduced optical reflectance not only in the wavelength region of 555 nm that provides the best sensitivity but also in a surrounding wavelength region.) Therefore, in this sense, the reflecting mirror 140 reduces or prevents double images more effectively.

<Seventh Embodiment>

Next, a seventh embodiment of the present invention will be explained.

Figure 18:
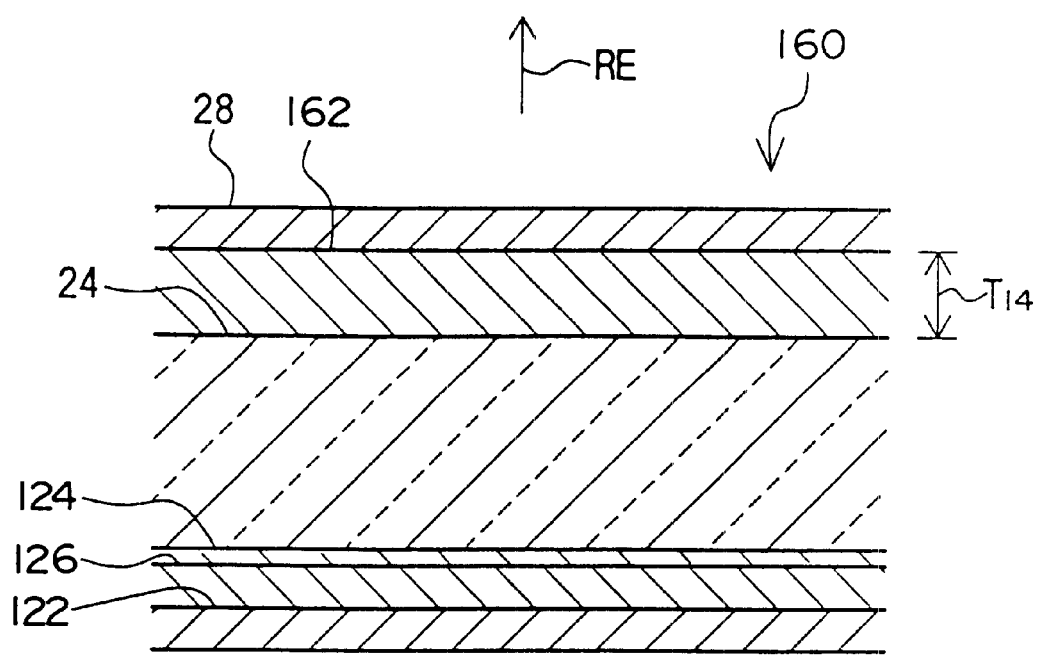
FIG. 18 is a schematic cross-sectional view showing the configuration of a reflecting mirror according to a seventh embodiment of the present invention.

FIG. 18 is a schematic cross-sectional view showing a reflecting mirror 160 according to a seventh embodiment of the present invention. As shown in this figure, unlike the reflecting mirror 120 according to said fifth embodiment, the reflecting mirror 160 is not provided with the sodium diffusion limiting coating 66. Moreover, a photocatalytic coating 162 is provided in place of the photocatalytic coating 66. The photocatalytic coating 162 is principally the same as the photocatalytic coating 66 in terms of material used for making up the same but has a structure different from that of the photocatalytic coating 66 in that the thickness $T_{14}$ thereof is set to approximately 250 nm. Furthermore, the photocatalytic coating 162 is approximately 250 nm in thickness, however, the photocatalytic coating 162 may be set to within a range from 230 nm to 270 nm in thickness.

The aforementioned setting range of the thickness of the photocatalytic coating 162 of the reflecting mirror 160 is principally included in that of the photocatalytic coating 30 of the reflecting mirror 10 according to said first embodiment. Accordingly, this will provide the action and effect that are equivalent to those provided by the photocatalytic coating 30.

That is, the reflecting mirror 160 is not provided with the aforementioned sodium diffusion limiting coating 66, and thus the sodium ingredient contained in the glass substrate 24 diffuses to the photocatalytic coating 162. However, the photocatalytic coating 162 is set to a range of 230 nm to 250 nm in thickness, so that the sodium ingredient will never reach the vicinity of the hydrophilic coating 28 of the photocatalytic coating 162. Thus, full use of the photocatalytic action can be made.

Figure 19:
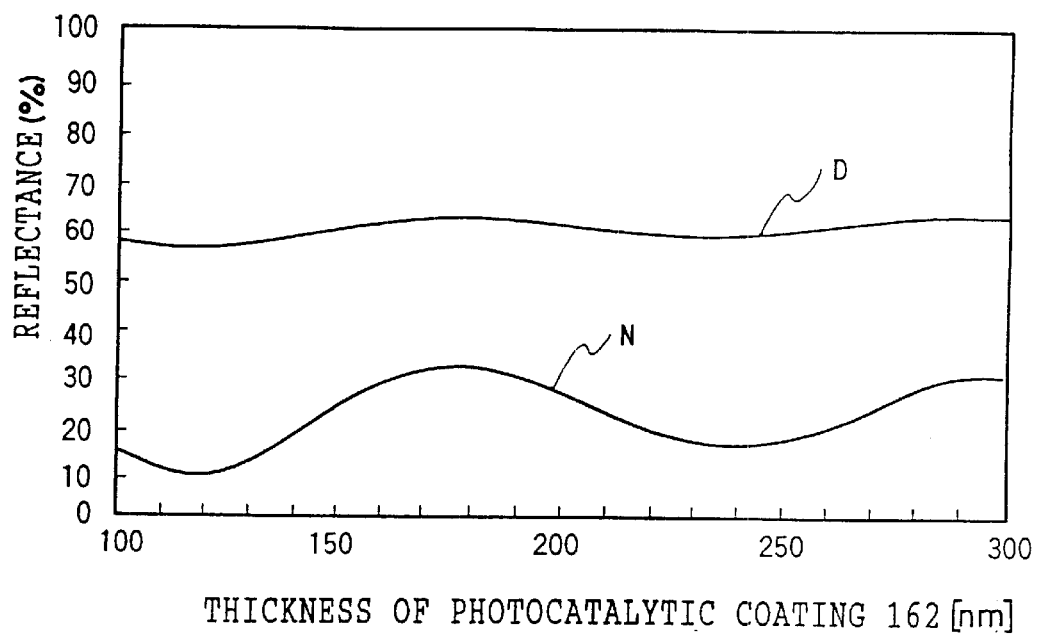
FIG. 19 is a graph showing the relationship between the thickness of a photocatalytic coating and the surface reflectance.

By the way, as shown in curve D of FIG. 19, the surface optical reflectance of the photocatalytic coating 162 during a day (daytime) is not affected comparatively by the thickness of the photocatalytic coating 162, being close to a constant value. In contrast, as shown by curve N, the surface optical reflectance of the photocatalytic coating 162 is affected by the thickness of the photocatalytic coating 162 when light equivalent to that from headlamps of other vehicle during night is incident thereupon. Here, in the reflecting mirror 160, the photocatalytic coating 162 is set to approximately 250 nm in thickness. Accordingly, as shown in FIG. 19, the surface optical reflectance of the photocatalytic coating 162 becomes approximately 15% when light equivalent to that from headlamps of other vehicle during night is incident thereupon. This will reduce the formation of double images caused by surface reflection.

Figure 20:
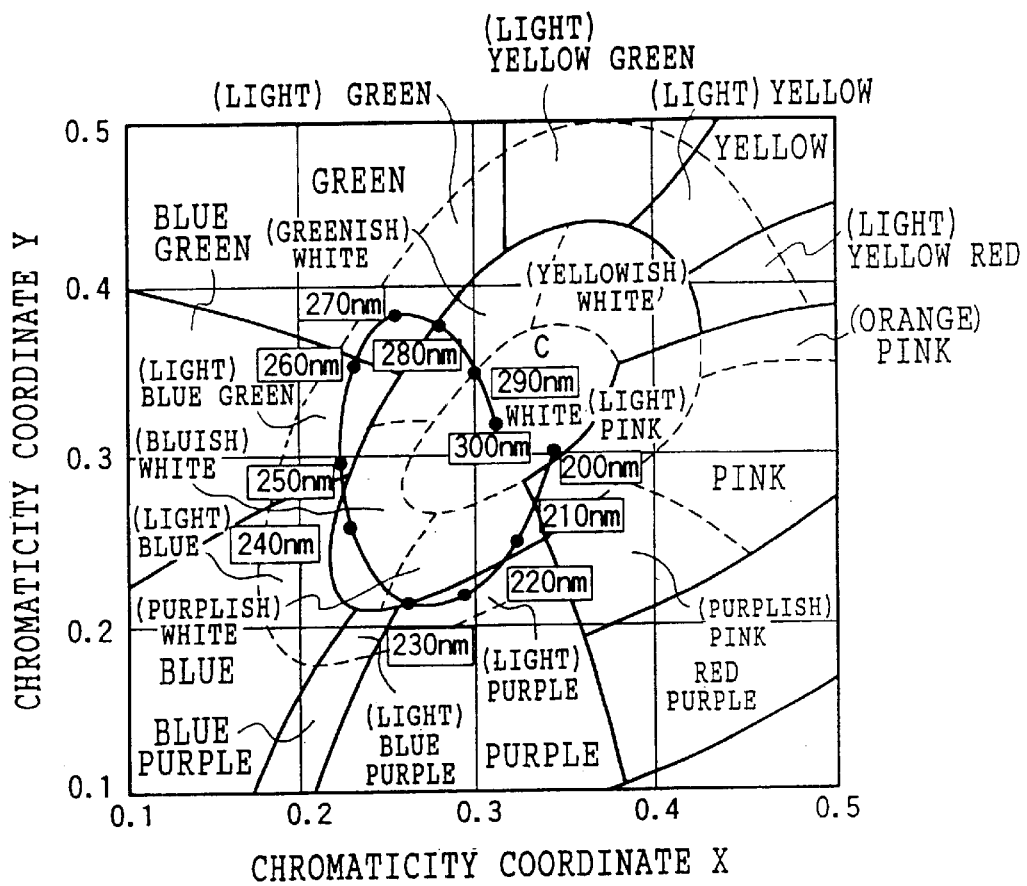
FIG. 20 is a view showing the chromaticity scale diagram indicating the relationship between the thickness of the photocatalytic coating and the hue of light reflected on the surface.
Figure 21:
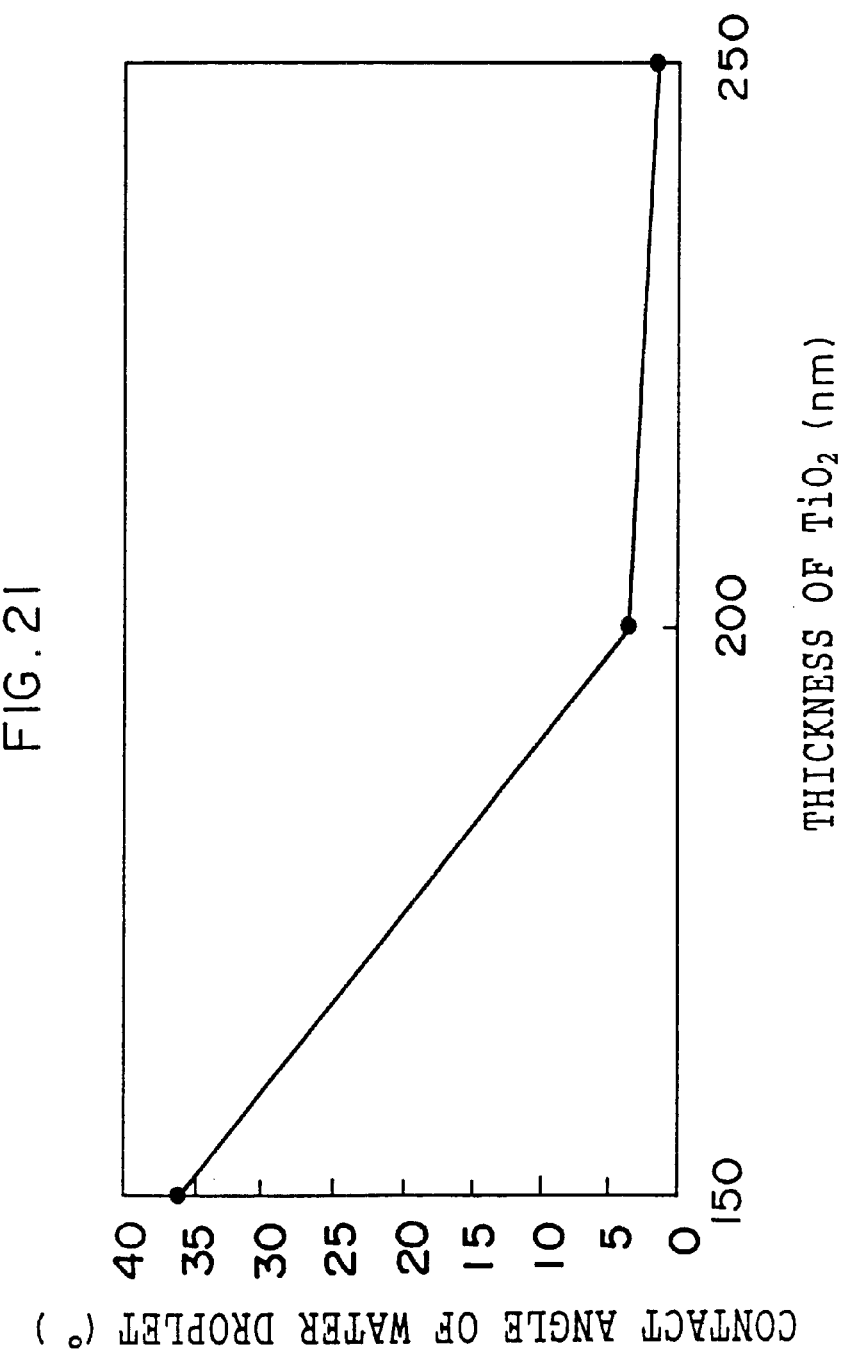
FIG. 21 is a graph showing the relationship between the thickness of the photocatalytic coating predominantly composed of titanium dioxide and a water droplet adhered on a surface to which a grease film is applied.
Figure 22:
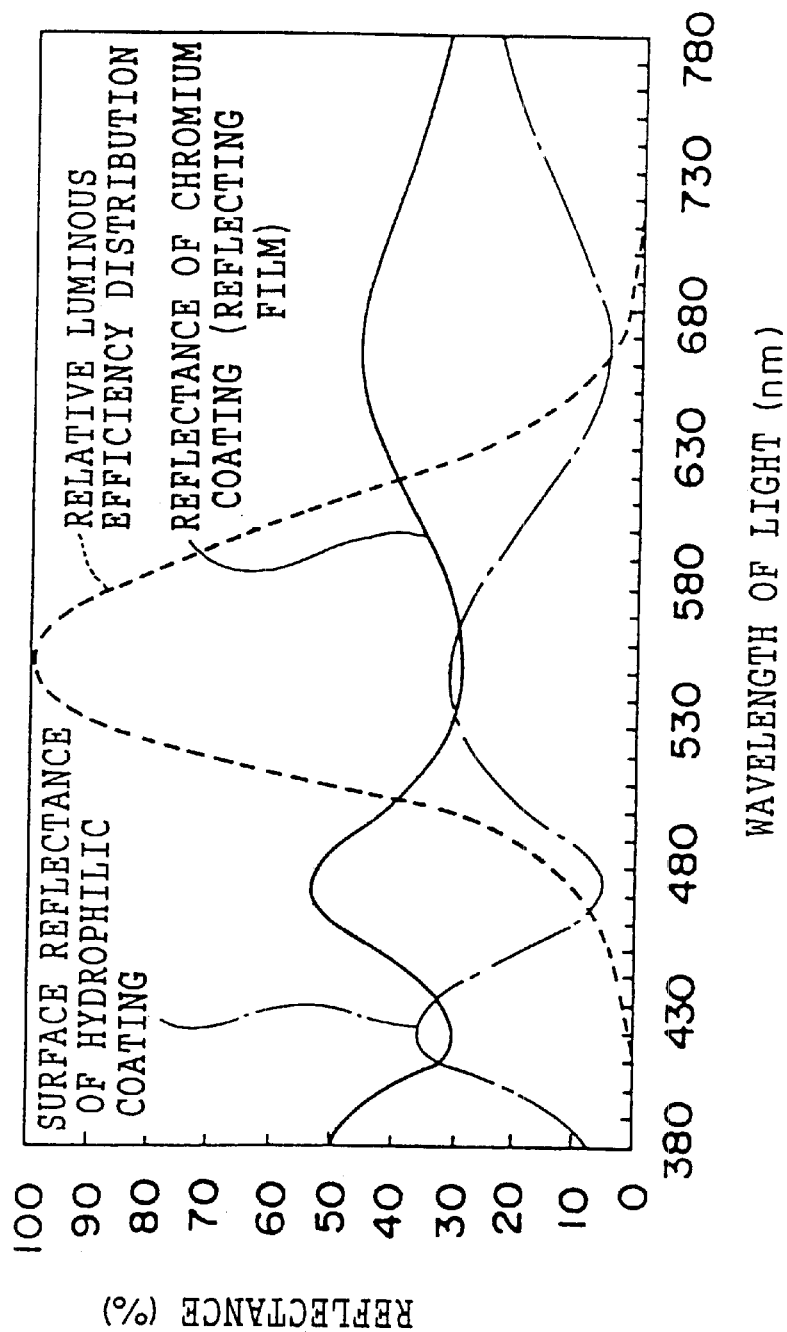
FIG. 22 is a graph showing the reflectance of the reflecting film for each wavelength of light on a conventional reflecting mirror to which a hydrophilic coating and photocatalytic coating are applied and the reflectance of the surface of the hydrophilic coating.

Furthermore, in the reflecting mirror 160 with the photocatalytic coating 162 having a thickness of approximately 250 nm, as shown in the chromaticity coordinates of FIG. 20, the hue of the surface reflected light becomes from light purple to light blue. Thus, the surface reflected light contains less light of low wavelengths that constitutes red.

Here, reddish light has longer wavelengths and thus high energy and as well human eyes are highly sensitive to red for a structural reason thereof (more cells are present which are sensitive to red). Therefore, when images composed of light containing red are viewed, the after-image thereof is apt to remain. However, since the reflecting mirror 160 allows the hue of surface reflected light to become substantially from light purple to light blue, a passenger who views images (reflected images) formed by the reflected light hardly experiences the after-image thereof.

Furthermore, in this embodiment, the photocatalytic coating 162 is approximately 250 nm in thickness, however, the thickness of the photocatalytic coating 162 maybe set to within a range of 230 nm to 270 nm to obtain the action and effect equivalent to those of this embodiment. As shown in FIG. 19, with the aforementioned range, the surface optical reflectance of the photocatalytic coating 162 lies within a range of 15% to 25%. In addition, from the point of view of the hue of the surface reflected light, look at curve C that connects the coordinates indicating the thickness of the photocatalytic coating 162 varied in the chromaticity coordinates of FIG. 20. This will teach that the reflected light contains pink with the photocatalytic coating 162 being approximately 200 nm in thickness and purple with approximately 210 nm to 220 nm. That is, the reflected light contains comparatively more of reddish color, whereas the reflected light contains purple with approximately 230 nm, the purple being comparatively bluish and whitish light purple, red color being reduced. With 230 nm or greater, the reflected light becomes from whitish blue through light blue green to light green, red color also being reduced. As such, the thickness of he photocatalytic coating 162 set to a range of 230 nm to 270 nm will never impair the aforementioned effect.

As described above, the reflecting mirror according to the present invention can prevent double images and as well secures a sufficient hydrophilic property. Furthermore, as described in the foregoing, the reflecting mirror according to the present invention is suitable for a reflecting mirror to be mounted outside the cabin of a vehicle such as a door mirror or fender mirror of a vehicle. The reflecting mirror can be applied not only to that of a vehicle defined as an automobile in a narrow sense but also to that of vehicles such as railcars. In addition to vehicles, the reflecting mirror also can be applied, for example, to an ordinary reflecting mirror installed for outdoor use or to a special-purpose concave mirror. Furthermore, the reflecting mirror also can be applied to a reflecting mirror for indoor use, for example, to one to be installed in a humid environment such as a bathroom where water droplets are apt to adhere on the surface thereof.

What is claimed is:

1. A reflecting mirror comprising:
    a substantially transparent glass substrate having opposite sides,
    a reflecting film which provided on one side of said glass substrate for reflecting light incident on the other side of said glass substrate,
    a hydrophilic coating predominantly composed of silicon dioxide, provided on the side of said glass substrate opposite said reflecting film, having a thickness ranging from 5 nm to 20 nm, and
    a photocatalytic coating predominantly composed of titanium dioxide, provided between said hydrophilic coating and said glass substrate, having a thickness ranging from 220 nm to 280 nm, for decomposing organic substances adhered on said hydrophilic coating by photocatalytic action.

2. A reflecting mirror according to claim 1, wherein the thickness of said photocatalytic coating ranges from 250 nm to 280 nm.

3. A reflecting mirror according to claim 2, selectively reflecting light of a wavelength ranging from 430 nm to 490 nm.

4. A reflecting mirror according to claim 3, wherein said reflecting film includes:
    a reflecting film body for reflecting incident light, and
    an optical thin film, for selectively absorbing light of a wavelength other than a wavelength ranging mainly from 430 nm to 490 nm, provided between said reflecting film body and said glass substrate.

5. A reflecting mirror according to claim 3, wherein said glass substrate selectively absorbs light of a wavelength other than a wavelength ranging mainly from 430 nm to 490 nm of transmitted light.

6. A reflecting mirror comprising:
    a substantially transparent glass substrate having opposite sides,
    a reflecting film provided on one side of said glass substrate and which reflects light incident on the other side of said glass substrate,
    a hydrophilic coating and provided on the other side of said glass substrate, and
    a photocatalytic coating, predominantly composed of titanium oxide, having a thickness ranging from 230 nm to 270 nm, provided between said hydrophilic coating and said glass substrate, for decomposing organic substances on said hydrophilic coating by photocatalytic action.

7. A reflecting mirror according to claim 6, wherein an electrochromic coating comprising a conductive coating which is colored or discolored by being energized or not energized is provided between said reflecting film and said glass substrate.

* * * * *